(12) United States Patent
Panik et al.

(10) Patent No.: US 12,382,954 B2
(45) Date of Patent: Aug. 12, 2025

(54) PINOCEMBRIN DIHYDROCHALCONE AND COMPOSITIONS THEREOF AND THEIR USE AS PESTICIDES

(71) Applicant: METABOLIC INSIGHTS LTD., Ness-Ziona (IL)

(72) Inventors: David Panik, Rehovot (IL); Ido Korman, Sde Nitzan (IL)

(73) Assignee: METABOLIC INSIGHTS LTD., Ness-Ziona (IL)

( * ) Notice: Subject to any disclaimer, the term of this patent is extended or adjusted under 35 U.S.C. 154(b) by 632 days.

(21) Appl. No.: 17/829,627

(22) Filed: Jun. 1, 2022

(65) Prior Publication Data
US 2022/0354115 A1 Nov. 10, 2022

Related U.S. Application Data

(63) Continuation-in-part of application No. PCT/IL2020/051239, filed on Dec. 2, 2020.

(30) Foreign Application Priority Data

Dec. 2, 2019 (IT) .................. 102019000022740

(51) Int. Cl.
*A01N 35/04* (2006.01)
(52) U.S. Cl.
CPC .................. *A01N 35/04* (2013.01)
(58) Field of Classification Search
None
See application file for complete search history.

(56) References Cited

FOREIGN PATENT DOCUMENTS

| CN | 104725137 A | 6/2015 |
|---|---|---|
| WO | 2013171720 A1 | 11/2013 |
| WO | 2015069708 A1 | 5/2015 |
| WO | 2016022901 A1 | 2/2016 |

OTHER PUBLICATIONS

Eichenberger, M. et al., Metabolic Engineering 39: 80 â 89 (2017). (Year: 2017)*
Hufford et al (1978). "Antimicrobial activities of constituents of Uvaria chamae" Lloydia, 41(2):1, pp. 156-160. PMID: 651562.
Sato et al. (1995). "Syntheses of 2,4,6-trihydroxy-, 2,4,6-trihydroxy-5-methyl- and 2,4,5,6-tetrahydroxy-substituted 3-(3-phenylpropionyl) benzaldehydes and their bactericidal activity" Phytochemistry vol. 38, Issue 2, . pp. 491-493. https://doi.org/10.1016/0031-9422(94)00699-T.
Enamine (2015). Safety data sheet for 3-phenyl-1-(2,4,6-trihydroxyphenyl)propan-1., pp. 1-7. [https://enaminestore. com].
Bremner et al (1998). "Pinocembrin Chalcone: An Antibacterial Compound from Helichrysum trilineatum" Planta Med 64(8): 777. doi: 10.1055/s-2006-957585. PMID: 9933997.
Lavoie et al (2013). "New antibacterial dihydrochalcone derivatives from buds of *Populus balsamifera* " Tetrahedron Letters, vol. 54, Issue 13, 27 pp. 1631-1633. https://doi.org/10.1016/j.tetlet.2012.12.012.
Extended European Search Report for European Patent Application No. 20896295.1., dated Nov. 24, 2023, 22pp.
Erlacher et al; "The impact of the pathogen Rhizoctonia solani and its beneficial counterpart Bacillus amyloliquefaciens on the indigenous lettuce microbiome". Front Microbiol. 5: 175. (2014).
Hofte . et al;. "Plant pathogenic pseudomonas species." Gnanamanickam S.S. (ed.), Plant-Associated Bacteria, pp. 507-533. (2006).
Martin et al;. :Soilborne Plant Diseases Caused by *Pythium* spp.: Ecology, Epidemiology, and Prospects for Biological Control:. Critical Reviews in Plant Science 18:pp. 111-181.(1999).
Lee et al; "Characterization of genes required for the pathogenicity of *Pectobacterium carotovorum* subsp. carotovorum Pcc21 in Chinese cabbage". Microbiology. 159(Pt 7): pp. 1487-1496. (2013).
Moore Pseudomonas syringae: disease and ice nucleation activity:. Ornamentals Northwest Newsletter. 12:pp. 4-16. (1988).
Savory et al; T"he cucurbit downy mildew pathogen *Pseudoperonospora cubensis* ". Molecular Plant Pathology 212(3): pp. 217-26. (2011).
Sedláková et al; "Effect of Phytophthora infestans on potato yield in dependence on variety characteristics and fungicide control". Plant Soil Environment, 57, (10): pp. 486-491. (2011).
Timilsina et al; "Xanthomonas diversity, virulence and plant-pathogen interactions". nature reviews microbiology 18, pp. 415-427 (2020).
Gessese. "Description of Wheat Rusts and Their Virulence Variations Determined through Annual Pathotype Surveys and Controlled Multi-Pathotype Tests" Advances in Agriculture, Article ID 2673706. (2019).
PCT Search Report for International Application No. PCT/IL2020/051239, mailed Mar. 9, 2021, 4 pp.
PCT Written Opinion for International Application No. PCT/IL2020/051239, mailed Mar. 9, 2021, 5 pp.

* cited by examiner

*Primary Examiner* — David J Blanchard
*Assistant Examiner* — Daniel F Coughlin
(74) *Attorney, Agent, or Firm* — The Roy Gross Law Firm, LLC; Roy Gross

(57) ABSTRACT

A composition comprising pinocembrin dihydrochalcone or an agriculturally acceptable salt thereof as an active pesticidal ingredient is provided. A method for controlling, preventing, reducing or eradicating the instances of plant-pathogen infestation on a plant, plant organ, plant part, or plant propagation material is further provided, the method comprising: applying to a plant, plant part, plant organ or plant propagation material, or to soil surrounding said plant, a pesticidal effective amount of an active agent comprising pinocembrin dihydrochalcone or a pesticide composition comprising it, wherein said plant-pathogen is a member selected from: a genus of the family Sclerotiniaceae selected from *Fusarium* and *Sclerotinia*; a Peronosporales of the families Pythiaceae and Peronosporaceae; a Basidiomycota of the class Agaricomycetes and Pucciniomycetes; and an order of Gamma Proteobacterium selected from Enterobacteriales, Xanthomonadales and Pseudomonadales.

12 Claims, 6 Drawing Sheets

PINOCEMBRIN DIHYDROCHALCONE AND COMPOSITIONS THEREOF AND THEIR USE AS PESTICIDES

CROSS REFERENCE TO RELATED APPLICATIONS

The present application is a continuation in part of PCT Patent Application No. PCT/IL2020/051239 filed Dec. 2, 2020, which claims the benefit of priority to Italian Patent Application No. 102019000022740 filed Dec. 2, 2019, the contents of which are incorporated by reference herein in their entirety.

FIELD OF THE INVENTION

The present invention relates in general to a compound having fungicidal and bactericidal properties for agricultural uses.

BACKGROUND OF THE INVENTION

Plant pests and diseases represent major challenges to productivity in modern agriculture.

*Fusarium* spp. is a large genus of filamentous fungi belonging to phylogenetic lineage of Ascomycetes. Many species of *Fusarium* are pathogenic to plants and cause serious diseases like wilt or 'rot' of economically important plants mostly vegetables. In addition, *Fusarium* species infects cereals causing head blight and ear rot in maize and cause mycotoxins to accumulate under certain conditions (J. E. E. Jenkins, Y. S. Clark and A. E. Buckle, 1998).

Soil-borne plant pathogens cause crucial damage to agricultural crops. The phytopathogenic fungus *Rhizoctonia* spp. belongs to the phylogenetic lineage of Basidiomycetes and causes a wide range of commercially significant plant diseases, such as brown patch, damping off in seedlings, root rot and belly rot. All *Rhizoctonia* diseases in plants, and subsequent secondary infections, are difficult to control (Erlacher et al., 2014). Adequate control of *Rhizoctonia* spp. is crucial for productivity of various agricultural crops such as rice and various vegetables.

*Pythium* spp. is a phytopathogenic fungus-like organism which belongs to the phylogenetic lineage of eukaryotic microorganisms called Oomycetes which causes the widespread "damping off" disease of tobacco, tomato, mustard, chilies and cress seedlings (Martin & Loper, 2010).

*Phytophthora* spp. is an obligatory plant fungal like pathogen which belongs to phylogenetic lineage of eukaryotic microorganisms called Oomycetes. *Phytophthora infestans* is a serious potato disease known as potato blight resulting in foliage blight and rot of tubers. The disease can cause complete loss of a potato harvest (Sedláková et al., 2012). *Phytophthora* attacks the aerial parts of many plant species, and it is the major cause of leaf blight, canker fruit rot diseases in tomato, pumpkins and other crops.

*Pseudoperonospora* spp. is an obligatory plant fungal like pathogen which belongs to phylogenetic lineage of Oomycetes. *Pseudoperonospora* spp. causes devastating downy mildew diseases on various plants such as cucurbits, watermelons, squash (Savory at al., 2011).

*Puccinia* spp. is an obligatory pathogenic fungus and a major genus in plant rusts belonging to phylogenetic lineage of Basidiomycetes. *Puccinia* spp. causes a wide range of commercially significant plant diseases in cereals (such as yellow rust in wheat) and maize (common rust)—(Gessese 2019; Groth et al., 1998).

*Sclerotinia* spp. is a plant pathogenic fungus belonging to the phylogenetic lineage of Ascomycetes. *Sclerotinia* spp. causes disease called white mold in many plant hosts, most of them vegetables (ANR publication 8042. *Sclerotinia* diseases—ISBN 978-1-60107-220-7).

*Pectobacterium carotovorum* is a bacterial plant pathogen belonging to the phylogenetic lineage of Gamma Proteobacteria that causes soft rot disease in many vegetables (cabbage, potato, onion, radish, etc.) during cultivation, transportation and storage, resulting in considerable economic damage mainly during post-harvest storage (Lee et al., 2013).

*Pseudomonas* spp. is a plant pathogenic bacterial genus also belonging to the phylogenetic lineage of Gamma Proteobacteria. *Pseudomonas* spp. causes leaf and stem lesions in economically significant crops plants and orchards such as: pith necrosis in parsnip and tomato, brown blotch and leaf sheath brown rot in rice, bacterial canker in almonds and olive knot disease in olives (Moore L. W., 1988; Hofte M. and De Vos P., 2006). A variety of methods have been tested for the management of *Pseudomonas* spp. in crop plants including cultural management, host resistance, biological control with microbial antagonists, and chemical control. None of them gives full control.

*Xanthomonas* spp. is very diverse plant pathogenic bacterial genus which affects many crops including tomatoes, peppers, citrus and various brassicas (Timilsina et al., 2020).

The number of available active ingredients for crop protection purposes against these diseases is diminishing from year to year due to increasing pest resistance, erratic climatic conditions and mounting regulatory pressure. New active ingredients based on novel chemical molecules represent a promising avenue for development of crop protection solutions.

SUMMARY OF INVENTION

In one aspect, the present invention relates to a method for controlling, preventing, reducing or eradicating the instances of plant-pathogen infestation on a plant, plant organ, plant part, or plant propagation material, the method comprising: applying to a plant, plant part, plant organ or plant propagation material, or to soil surrounding said plant, a pesticidal effective amount of pinocembrin dihydrochalcone or a pesticide composition of comprising a pesticidally effective amount of pinocembrin dihydrochalcone, wherein said plant-pathogen is a member selected from: a genus of the family Sclerotiniaceae selected from *Fusarium* and *Sclerotinia*; a Peronosporales of the families Pythiaceae and Peronospoeaceae; a Basidiomycota of the classes Agaricomycetes and Pucciniomycetes; and an order of Gamma Proteobacterium selected from Enterobacteriales, Xanthomonadales and Pseudomonadales.

In another aspect, the present invention relates to a pesticide composition comprising pinocembrin dihydrochalcone or an agriculturally acceptable salt thereof as an active pesticidal ingredient.

DETAILED DESCRIPTION OF THE INVENTION

Figure 1:
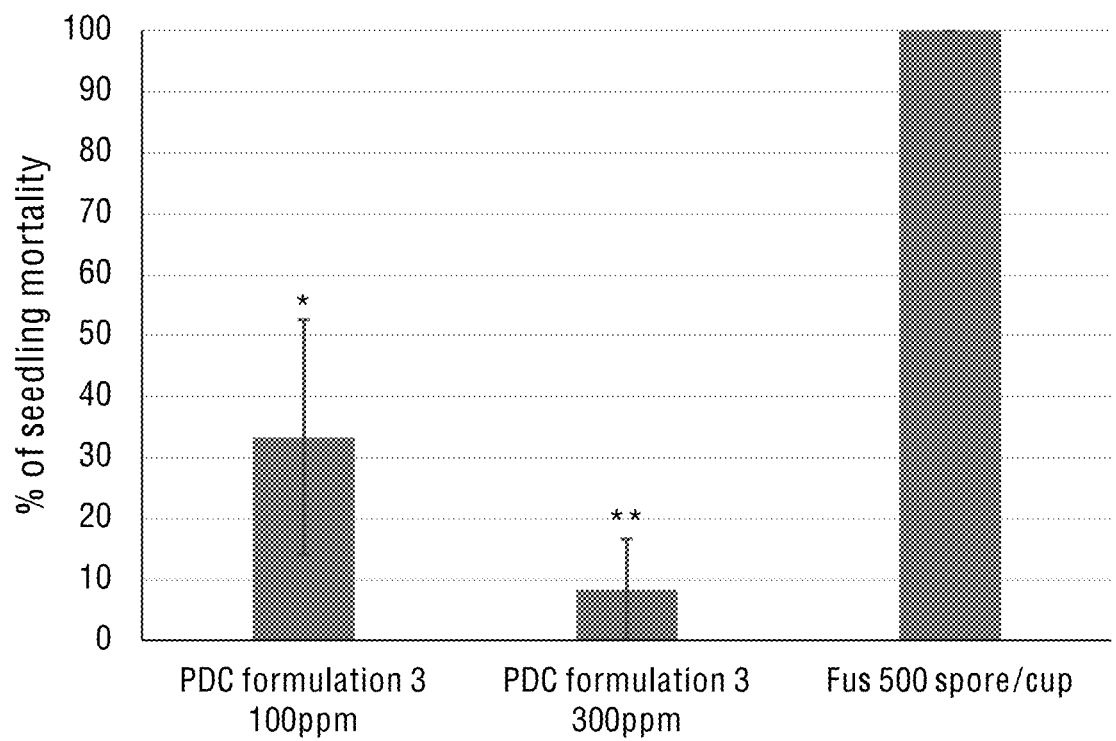
FIGS. 1-3 show effect of pinocembrin dihydrochalcone (PDC) on cucumber seedlings survival in 3 independent experiments determined as survival percentage three weeks following inoculation with *Fusarium oxysporum*. * Means that p-value<0.05, means that p-value is <0.01, *means that p-value is <0.001. Formulation 3—see Example 11 (A).

It has been found in accordance with the present invention that pinocembrin dihydrochalcone is a potent pesticide against two genera of the family Sclerotiniaceae; a Peronosporales of the families Pythiaceae and Peronosporaceae; a Basidiomycota of the classes Agaricomycetes and Pucciniomycetes; and three different orders of Gamma Proteobacteria.

Pinocembrin dihydrochalcone is a member of the class of chalcone C-glycosides. The CAS name of pinocembrin dihydrochalcone as 3-phenyl-1-(2,4,6-trihydroxyphenyl) propan-1-one, having also the following synonyms: 1-propanone, 3-phenyl-1-(2,4,6-trihydroxyphenyl), 3-phenyl-1-(2,4,6-trihydroxyphenyl)-1-propanone, and 2',4',6'-trihydroxydihydrochalcone. The CAS registry number is: 1088-08-0.

Thus, the present invention, in one aspect, is directed to a pesticide composition comprising pinocembrin dihydrochalcone or an agriculturally acceptable salt thereof as an active pesticidal ingredient.

In some embodiments, the pesticide composition further comprises an agriculturally suitable or acceptable solvent or solubilizing agent.

In certain embodiments, the agriculturally acceptable solvent or solubilizing agent is a water-miscible solvent capable of dissolving or solubilizing pinocembrin dihydrochalcone.

In further embodiments, the water-miscible solvent capable of dissolving or solubilizing pinocembrin dihydrochalcone is a polar solvent, such as an alcohol, a ketone, a lactone, a keto-alcohol, a glycol, a glycoether, an amide, an alkanolamine, a sulfoxide and a pyrrolidone.

In some embodiments, the composition further comprises a nonionic surfactant. Non-limiting examples of this surfactant are polysorbate-type surfactants such as TWEEN® 20, TWEEN® 40, TWEEN® 60 and TWEEN® 80, or polyethylene-oxide-ether surfactants such as BRIJ® 35, BRIJ® 58 and BRIJ® 93.

In particular embodiments, the composition comprises a solvent selected from dimethyl-sulfoxide or ethanol, and a polysorbate-type nonionic surfactant that is TWEEN® 20 (polysorbate 20).

In another aspect, the present invention provides a method for controlling, preventing, reducing or eradicating plant-pathogen infestation or instances thereof, on a plant, plant organ, plant part, or plant propagation material, the method comprising: applying to a plant, plant organ or plant propagation material, or to soil surrounding said plant, a pesticidally effective amount of pinocembrin dihydrochalcone or a pesticide composition or formulation comprising a pesticidally effective amount of pinocembrin dihydrochalcone of any one of the above embodiments, wherein said plant-pathogen is a member selected from: a genus of the family Sclerotiniaceae selected from *Fusarium* and *Sclerotinia*; a Peronosporales of the families Pythiaceae and Peronosporaceae; a Basidiomycota of the classes Agaricomycetes and Pucciniomycetes; and an order of Gamma Proteobacterium selected from Enterobacteriales, Xanthomonadales and Pseudomonadales.

The method of treatment of the present invention is useful for example against diseases like wilt or 'rot; head blight and ear rot in maize; brown patch; root rot and belly rot; damping off" disease of tobacco, tomato, mustard, chilies and cress seedlings; white mold in many plant hosts, such as vegetables; soft rot disease in many vegetables (cabbage, potato, onion, radish, etc); pith necrosis in parsnip and tomato; brown blotch and leaf sheath brown rot in rice, bacterial canker in almonds; and olive knot disease in olive.

In certain embodiments, the plant-pathogen is a member of the genus *Fusarium*, such as *Fusarium oxysporum, Fusarium avenaceum, Fusarium bubigeum, Fusarium circinatum, Fusarium crookwellense, Fusarium culmorum, Fusarium graminearum, Fusarium langsethiae, Fusarium poae, Fusarium proliferaturn, Fusarium solani, Fusarium sporotrichioides, Fusarium tricinctum, Fusarium venenatum, Fusarium verticillioides,* and *Fusarium virguliforme*.

In other embodiments, the plant-pathogen is *Fusarium oxysporum*.

In still other embodiments, the plant-pathogen is a member of the genus *Sclerotinia* such as *Sclerotinia sclerotiorum, Sclerotinia borealis, Sclerotinia bulborum* (Wakker) Sacc., *Sclerotinia homoeocarpa* F. T. Benn., *Sclerotinia minor* Jagger, *Sclerotinia ricini, Sclerotinia sclerotiorum* (Lib.) de Bary, *Sclerotinia spermophila* Noble, *Sclerotinia sulcate, Sclerotinia trifoliorum* Erikss., and *Sclerotinia veratri*.

In further embodiments, the plant-pathogen is *Sclerotinia sclerotiorum*.

In yet further embodiments, the plant-pathogen is a member of the families Pythiaceae and Peronosporaceae.

In some embodiments, the Pythiaceae plant-pathogen is a member of the genus *Pythium*, such as *Pythium aphanidermatum, Pythium acanthicum, Pythium acanthophoron, Pythium acrogynum, Pythium adhaerens, Pythium amasculinurn, Pythium anandrum, Pythium angustatum, Pythium apleroticum, Pythium aquatile, Pythium aristosporum, Pythium arrhenomanes, Pythium attrantheridium, Pythium bifurcatum, Pythium boreale, Pythium buismaniae, Pythium butleri, Pythium camurandrum, Pythium campanulaturn, Pythium canariense, Pythium capillosum, Pythium carbonicum, Pythium carolinianum, Pythium catenulaturn, Pythium chamaehyphon, Pythium chondricola, Pythium citrinurn, Pythium coloratura, Pythium conidiophorum, Pythium contiguanum, Pythium cryptoirregulare, Pythium cucurbitacearum, Pythium cylindrosporum, Pythium cystogenes, Pythium debaryanurn, Pythium delicense, Pythium destruens, Pythium diclinum, Pythium dimorphurn, Pythium dissimile, Pythium dissotocum, Pythium echinulatum, Pythium emineosum, Pythium erinaceum, Pythium flevoense, Pythium folliculosum, Pythium glomeraturn, Pythium graminicola, Pythium grandisporangium, Pythium guiyangense, Pythium helicandrum, Pythium helicoides, Pythium heterothallicum, Pythium hydnosporum, Pythium hypogy-* num, *Pythium indigoferae, Pythium inflatum, Pythium insidiosurn, Pythium intermedium, Pythium irregulare, Pythium iwayamae, Pythium jasmonium, Pythium kunmingense, Pythium litorale, Pythium longandrum, Pythium longisporangium, Pythium lutarium, Pythium macrosporum, Pythium mamillatum, Pythium marinurn, Pythium marsupium, Pythium mastophorum, Pythium megacarpurn, Pythium middletonii, Pythium minus, Pythium monospermum, Pythium montanum, Pythium multisporum, Pythium myriotylum, Pythium nagaii, Pythium nodosum, Pythium nunn, Pythium oedochilum, Pythium okanoganense, Pythium oligandrum, Pythium oopapillum, Pythium ornacarpurn, Pythium orthogonon, Pythium ostracodes, Pythium pachycaule, Pythium pachycaule, Pythium paddicum, Pythium paroecandrum, Pythium parvum, Pythium pectinolyticum, Pythium periilum, Pythium periplocum, Pythium perniciosum, Pythium perplexum, Pythium phragmitis, Pythium pleroticum, Pythium plurisporium, Pythium polare, Pythium polymasturn, Pythium porphyrae, Pythium prolatum, Pythium proliferaturn, Pythium pulchrum, Pythium pyriloburn, Pythium quercum, Pythium radiosum, Pythium ramificaturn, Pythium regulare, Pythium rhizooryzae, Pythium rhizosaccharum, Pythium rostratifingens, Pythium rostratum, Pythium salpingophorum, Pythium scleroteichurn, Pythium segnitium, Pythium speculum, Pythium spinosum, Pythium splendens, Pythium sterilum, Pythium stipitaturn, Pythium sulcatum, Pythium terrestris, Pythium torulosum, Pythium tracheiphilum, Pythium ultimum, Pythium ultimum* var. *ultimum, Pythium uncinulatum, Pythium undulatum, Pythium vanterpoolii, Pythium viniferum, Pythium violae, Pythium volutum, Pythium zingiberis,* and *Pythium zingiberum.*

In certain embodiments, the plant-pathogen is a member of the class Agaricomycetes.

In particular embodiments, the Agaricomycetes plant-pathogen is a member of the order Cantharellales.

In some embodiments, the Cantharellales plant-pathogen is a member of the family Ceratobasidiaceae.

In other embodiments, the Ceratobasidiaceae plant-pathogen is a member of the genus *Rhizoctonia*, such as *Rhizoctonia solani, Rhizoctonia bataticola* also known as *Macrophomina phaseolina, Rhizoctonia carotae* also known as *Fibulorhizoctonia carotae, Rhizoctonia cerealis, Rhizoctonia crocorum* also known as *Thanatophytum crocorum, Rhizoctonia fragariae, Rhizoctonia goodyerae-repentis* also known as *Ceratobasidium cornigerum, Rhizoctonia oryzae* also known as *Waitea circinate,* and *Rhizoctonia ramicola* also known as *Ceratorhiza ramicola.*

In particular embodiments, the plant-pathogen is *Rhizoctonia solani.*

In further embodiments, the plant-pathogen is a member of the class Pucciniomycetes of an order selected from Helicobasidiales, Pachnocybales, Platygloeales, Pucciniales, and Septobasidiales.

In specific embodiments the plant-pathogen is a member of the order Pucciniales.

In certain embodiments, the Pucciniales plant-pathogen is a member of a family selected from Chaconiaceae, Coleosporiaceae, Cronartiaceae, Melampsoraceae, Mikronegeriaceae, Phakopsoraceae, Phragmidiaceae, Pileolariaceae, Pucciniaceae, Pucciniosiraceae, Pucciniastraceae, Raveneliaceae, Sphaerophragmiaceae, Uncolaceae, Uropyxidaceae, mitosporic Pucciniales and Pucciniales incertae sedis.

In particular embodiments, the Pucciniales plant-pathogen is a member of the family Pucciniaceae.

In some embodiments, the Pucciniaceae plant-pathogen is a member of the genus *Puccinia*, such as *Puccinia sorghi, Puccinia triticina, Puccinia coronate, Puccinia graminis, Puccinia hemerocallidis, Puccinia hemerocallidis, Puccinia persistens* subsp. *Triticina, Puccinia striiformis, Puccinia melanocephala, Puccinia kuehnii* and *Hemileia vastatrix.*

In a further specific embodiment, the *Puccinia* plant-pathogen is selected from *Puccinia triticina.*

In certain embodiments, the plant-pathogen is a member of the order Enterobacteriales.

In other certain embodiments, the Enterobacteriales plant-pathogen is a member of the family Enterobacteriaceae.

In particular embodiments, the Enterobacteriaceae plant-pathogen is a member of the genus *Pectobacterium*, such as *Pectobacterium caratovorum* and *Pectobacterium aroidearum.*

In some embodiments, the plant-pathogen is a member of the order Pseudomonadales.

In other embodiments, the Pseudomonadales plant-pathogen is a member of the family Pseudomonadaceae.

In still other embodiments, the Pseudomonadaceae plant-pathogen is a member of the genus *Pseudomonas*, such as *Pseudomonas aeroginosa* and *Pseudomonas syringae.*

In further embodiments, the plant-pathogen is a member of the order Xanthomonadales.

In yet further embodiments, the Xanthomonadales plant-pathogen is a member of the family Xanthomonadaceae.

In certain embodiments, the Xanthomonadaceae plant-pathogen is a member of the genus *Xanthomonas*, such as *Xanthomonas campestris, Xanthomonas cirri, Xanthomonas euvesicatoria* and *Xanthomonas oryzae.*

The plant treatment method of the present invention according to anyone of the embodiments disclosed herein is useful for example against the following diseases selected from potato blight, *Phytophthora palmivora* in cacao, canker fruit rot diseases in tomato and pumpkins, *Phytophthora* spp. crown and collar rot in pome and stone fruit.

In another embodiment, the plant-pathogen is a member of the class Oomycota of an order selected from Lagenidiales, Leptomitales, Peronosporales, Rhipidiales and Saprolegniales. In a particular embodiment, the plant-pathogen is a member of the class Oomycota of the order Peronosporales.

In still another embodiment, the Peronosporales plant-pathogen is a member of a family selected from Lagenidiaceae, Olpidiosidaceae, Sirolpidiaceae, Leptomitaceae, Albuginaceae, Peronosporaceae, Pythiaceae, Rhipidaceae, Ectrogellaceae, Haliphthoraceae, Leptolegniellaceae and Saprolegniaceae. In a specific embodiment, the plant-pathogen is a member of the family Peronosporaceae.

In some embodiments, the Peronosporaceae plant-pathogen is a member of the genus *Phytophthora*. In a specific embodiment, the *Phytophthora* plant-pathogen is selected from *Phytophthora acerina, Phytophthora agathidicida, Phytophthora alni, Phytophthora×alni, Phytophthora alticola, Phytophthora amaranthi, Phytophthora amnicola, Phytophthora amnicola×moyootj, Phytophthora andina, Phytophthora aquimorbida, Phytophthora arecae, Phytophthora arenaria, Phytophthora* cf. *arenaria, Phytophthora* aff. *arenaria, Phytophthora asiatica, Phytophthora asparagi, Phytophthora* aff. *asparagi, Phytophthora attenuata, Phytophthora austrocedrae, Phytophthora balyanboodja, Phytophthora batemanensis, Phytophthora bilorbang, Phytophthora bisheria, Phytophthora bishii, Phytophthora boehmeriae, Phytophthora boodjera, Phytophthora borealis, Phytophthora botryosa, Phytophthora* cf. *botryosa, Phytophthora* aff. *botryosa, Phytophthora brassicae, Phytophthora cactorum, Phytophthora cactorum* var. *applanata, Phytophthora cactorum×hedraiandra, Phy-* tophthora cajani, Phytophthora cambivora, Phytophthora capensis, Phytophthora capsici, Phytophthora aff. capsici, Phytophthora captiosa, Phytophthora castaneae, Phytophthora castanetorum, Phytophthora chlamydospora, Phytophthora chrysanthemi, Phytophthora cichorii, Phytophthora aff. cichorii, Phytophthora cinnamomi, Phytophthora cinnamomi var. cinnamomi, Phytophthora cinnamomi var. parvispora, Phytophthora cinnamomi var. robiniae, Phytophthora citricola, Phytophthora aff. citricola, Phytophthora citrophthora, Phytophthora citrophthora var. clementina, Phytophthora aff. citrophthora, Phytophthora clandestina, Phytophthora cocois, Phytophthora colocasiae, Phytophthora condilina, Phytophthora constricta, Phytophthora cooljarloo, Phytophthora crassamura, Phytophthora cryptogea, Phytophthora aff. cryptogea, Phytophthora cuyabensis, Phytophthora cyperi, Phytophthora dauci, Phytophthora aff. dauci, Phytophthora drechsleri, Phytophthora drechsleri var. cajani, Phytophthora elongata, Phytophthora cf. elongata, Phytophthora erythroseptica, Phytophthora erythroseptica var. pisi, Phytophthora aff. erythroseptica, Phytophthora estuarina, Phytophthora europaea, Phytophthora fallax, Phytophthora flexuosa, Phytophthora fluvialis, Phytophthora fluvialis×moyootj, Phytophthora foliorum, Phytophthora formosa, Phytophthora formosana, Phytophthora fragariae, Phytophthora fragariaefolia, Phytophthora frigida, Phytophthora gallica, Phytophthora gemini, Phytophthora gibbosa, Phytophthora glovera, Phytophthora gonapodyides, Phytophthora gondwanensis, Phytophthora gregata, Phytophthora cf. gregata, Phytophthora hedraiandra, Phytophthora aff. hedraiandra, Phytophthora×heterohybrida, Phytophthora heveae, Phytophthora hibernalis, Phytophthora himalayensis, Phytophthora himalsilva, Phytophthora aff. himalsilva, Phytophthora humicola, Phytophthora aff. humicola, Phytophthora hydrogena, Phytophthora hydropathica, Phytophthora idaei, Phytophthora ilicis, Phytophthora×incrassata, Phytophthora infestans, Phytophthora aff. infestans, Phytophthora inflata, Phytophthora insolita, Phytophthora cf. insolita, Phytophthora intercalaris, Phytophthora intricata, Phytophthora inundata, Phytophthora ipomoeae, Phytophthora iranica, Phytophthora irrigata, Phytophthora katsurae, Phytophthora kelmania, Phytophthora kernoviae, Phytophthora kwongonina, Phytophthora lactucae, Phytophthora lacustris, Phytophthora lacustris×riparia, Phytophthora lateralis, Phytophthora lilii, Phytophthora litchii, Phytophthora litoralis, Phytophthora litoralis×moyootj, Phytophthora macilentosa, Phytophthora macrochlamydospora, Phytophthora meadii, Phytophthora aff. meadii, Phytophthora medicaginis, Phytophthora medicaginis×cryptogea, Phytophthora megakarya, Phytophthora megasperma, Phytophthora melonis, Phytophthora mengei, Phytophthora mexicana, Phytophthora cf. mexicana, Phytophthora mirabilis, Phytophthora mississippiae, Phytophthora morindae, Phytophthora moyootj, Phytophthora moyootj×fluvialis, Phytophthora moyootj×litoralis, Phytophthora moyootj×thermophila, Phytophthora×multiformis, Phytophthora multivesiculata, Phytophthora multivora, Phytophthora nagaii, Phytophthora nemorosa, Phytophthora nicotianae, Phytophthora nicotianae var. parasitica, Phytophthora nicotianae×cactorum, Phytophthora niederhauserii, Phytophthora cf. niederhauserii, Phytophthora obscura, Phytophthora occultans, Phytophthora oleae, Phytophthora ornamentata, Phytophthora pachypleura, Phytophthora palmivora, Phytophthora palmivora var. palmivora, Phytophthora parasitica, Phytophthora parasitica var. nicotianae, Phytophthora parasitica var. piperina, Phytophthora parsiana, Phytophthora aff. parsiana, Phytophthora parvispora, Phytophthora×pelgrandis, Phytophthora phaseoli, Phytophthora pini, Phytophthora pinifolia, Phytophthora pisi, Phytophthora pistaciae, Phytophthora plurivora, Phytophthora pluvialis, Phytophthora polonica, Phytophthora porri, Phytophthora primulae, Phytophthora aff. primulae, Phytophthora pseudocryptogea, Phytophthora pseudolactucae, Phytophthora pseudorosacearum, Phytophthora pseudosyringae, Phytophthora pseudotsugae, Phytophthora aff. pseudotsugae, Phytophthora psychrophila, Phytophthora quercetorum, Phytophthora quercina, Phytophthora quininea, Phytophthora ramorum, Phytophthora rhizophorae, Phytophthora richardiae, Phytophthora riparia, Phytophthora rosacearum, Phytophthora aff. rosacearum, Phytophthora rubi, Phytophthora sansomea, Phytophthora sansomeana, Phytophthora aff. sansomeana, Phytophthora× serendipita, Phytophthora sinensis, Phytophthora siskiyouensis, Phytophthora sojae, Phytophthora stricta, Phytophthora sulawesiensis, Phytophthora syringae, Phytophthora tabaci, Phytophthora tentaculata, Phytophthora terminalis, Phytophthora thermophila, Phytophthora thermophila×amnicola, Phytophthora thermophila×moyootj, Phytophthora trifolii, Phytophthora tropicalis, Phytophthora cf. tropicalis, Phytophthora tubulina, Phytophthora tyrrhenica, Phytophthora uliginosa, Phytophthora undulata, Phytophthora uniformis, Phytophthora vignae, Phytophthora vignae f. sp. adzukicola, Phytophthora virginiana and Phytophthora vulcanica. In a further specific embodiment, the plant-pathogen is the species *Phytophthora infestans.*

The plant treatment method of the present invention according to anyone of the embodiments disclosed herein is useful for example against the following diseases selected from potato blight, *Phytophthora palmivora* in cacao, canker fruit rot diseases in tomato and pumpkins, *Phytophthora* spp. crown and collar rot in pome and stone fruit.

In certain embodiments, the Peronosporaceae plant-pathogen is a member of a genus selected from *Baobabopsis, Basidiophora, Benua, Bremia, Calycofera, Eraphthora, Graminivora, Hyaloperonospora, Nothophytophthora, Novotelnova, Paraperonospora, Perofascia, Peronosclerospora, Peronospora, Phytophthora, Plasmopara, Plasmoverna, Protobremia, Pseudoperonospora, Sclerophthora, Sclerospora* and *Viennotia.*

In some embodiments, the Peronosporaceae plant-pathogen is a member of the genus *Pseudoperonospora.*

In certain embodiments, the Peronosporaceae plant-pathogen is a member of a genus selected from *Pseudoperonospora cannabina, Pseudoperonospora cubensis* and *Pseudoperonospora humuli.*

In a further specific embodiment, the *Pseudoperonospora* plant-pathogen is the species *Pseudoperonospora cubensis.*

The plant treatment method of the present invention according to anyone of the embodiments disclosed herein is useful for example against the following diseases selected from downy mildew in cannabis, hemp, watermelons, cucurbits, squash, cantaloupe and pumpkin.

The pesticide composition of the present invention may be formulated into a formulation to facilitate application of the active pesticidal ingredient.

None limiting examples of the formulation may be a suspension concentrate (SC), a capsule suspension (CS), water-dispersible granules (WG), an emulsifiable concentrate (EC), a wettable powder (WP), a soluble (liquid) concentrate (SL), and a soluble powder (SP).

This formulation may further comprise at least one solvent or solubilizing agent, adjuvant, carrier, diluent, and/or surfactant.

Non-limiting examples of adjuvants are activator adjuvants, such as cationic, anionic or non-ionic surfactants, oils and nitrogen-based fertilizers capable of improving activity of the pesticide product. Oils may be crop oils, such as paraffin or naphtha-based petroleum oil, crop oil concentrates based on emulsifiable petroleum-based oil, and vegetable oil concentrates derived from seed oil, usually cotton, linseed, soybean, or sunflower oil, used to control grassy weeds. Nitrogen-based fertilizers may be ammonium sulfate or urea-ammonium nitrate.

Non-limiting examples of solubilizing agents or solvents are petroleum-based solvents, the aforementioned oils, liquid mixtures of fatty acids, ethanol, glycerol and dimethyl sulfoxide. The agriculturally acceptable solvent or solubilizing agent may be a water-miscible solvent capable of dissolving or solubilizing pinocembrin dihydrochalcone, such as a polar solvent, e.g., an alcohol, a ketone, a lactone, a keto-alcohol, a glycol, a glycoether, an amide, an alkanolamine, a sulfoxide and a pyrrolidone.

Non-limiting examples of carriers are precipitated silica, colloidal silica, attapulgite, China clay, talc, kaolin and combinations thereof.

The pesticide formulation may further comprise a diluent, such as lactose, starch, urea, water soluble inorganic salts and combination thereof.

The pesticide formulation may further comprise one or more surfactants, such as polysorbate-type nonionic surfactant, styrene acrylic dispersant polymers, acid resin copolymer based dispersing agents, potassium polycarboxylate, sodium alkyl naphthalene sulfonate blend, sodium diisopropyl naphthalene sulfonate, sodium salt of naphthalene sulfonate condensate, lignin sulfonate salts and combinations thereof.

Pinocembrin dihydrochalcone or the composition or formulation comprising it, may be applied in the method of any one of the above embodiments to the plant or part, organ or plant propagation material thereof by spraying, immersing, dressing, coating, pelleting or soaking.

According to certain embodiments of the invention, the concentration of pinocembrin dihydrochalcone in the composition or formulation comprising it may be in the range of 10-2000 parts per million (ppm; 1 ppm equals 1 mg of pinocembrin dihydrochalcone per kg when in dry form or 1 mg/L in liquid form).

In certain embodiments, the concentration of pinocembrin dihydrochalcone in the composition or formulation comprising it may be in the range of 10-2000, 10-1500, 10-1000, 10-900, 10-800, 10-700, 10-600, 10-500, 10-400, 10-300, 10-200, 10-100, 10-90, 10-80, 10-70, 10-60, 10-50, 10-40, 10-30, 10-20, 20-2000, 20-1500, 20-1000, 20-900, 20-800, 20-700, 20-600, 20-500, 20-400, 20-300, 20-200, 20-100, 20-90, 20-80, 20-70, 20-60, 20-50, 20-40, 20-30, 20-20. 30-2000, 30-1500, 30-1000, 30-900, 30-800, 30-700, 30-600, 30-500, 30-400, 30-300, 30-200, 30-100, 30-0, 30-100, 30-90, 30-80, 30-70, 30-60, 30-50, 30-40, 40-2000, 40-1500, 40-1000, 40-900, 40-800, 40-700, 40-600, 40-500, 40-400, 40-300, 40-200, 40-100, 40-90, 40-80, 40-70, 40-60, 40-50, 50-2000, 50-1500, 50-1000, 50-900, 50-800, 50-700, 50-600, 50-500, 50-400, 50-300, 50-200, 50-100, 50-90, 50-80, 50-70, 50-60, 60-2000, 60-1500, 60-1000, 60-900, 60-800, 60-700, 60-600, 60-500, 60-400, 60-300, 60-200, 60-100, 60-90, 60-80, 60-70, 70-2000, 70-1500, 70-1000, 70-900, 70-800, 70-700, 70-600, 70-500, 70-400, 70-300, 70-200, 70-100, 70-90, 70-80, 80-2000, 80-1500, 80-1000, 80-900, 80-800, 80-700, 80-600, 80-500, 80-400, 80-300, 80-200, 80-100, 80-90, 90-2000, 90-1500, 90-1000, 90-900, 90-800, 90-700, 90-600, 90-500, 90-400, 90-300, 90-200, 90-100, 100-2000, 100-1500, 100-1000, 100-900, 100-800, 100-700, 100-600, 100-500, 100-400, 100-300, 100-200, 200-2000, 200-1500, 200-1000, 200-900, 200-800, 200-700, 200-600, 200-500, 200-400, 200-300, 300-2000, 300-1500, 300-1000, 300-900, 300-800, 300-700, 300-600, 300-500, 300-400, 300-2000, 400-1500, 400-1000, 400-900, 400-800, 400-700, 400-600, 400-500, 500-2000, 500-1500, 500-1000, 500-900, 500-800, 500-700, 500-600, 600-2000, 600-1500, 600-1000, 600-900, 600-800, 600-700, 700-2000, 700-1500, 700-1000, 700-900, 700-800, 800-2000, 800-1500, 800-1000, 800-900, 900-2000, 900-1500, 900-1000, 1000-2000, or 1000-1500 ppm.

In particular, the concentration of pinocembrin dihydrochalcone in the composition or formulation comprising it may be 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 1000, 1500 or 2000 ppm.

Definitions

The term "pesticide" as used herein refers to a compound effective for controlling, preventing, reducing or eradicating plant-pathogen infestation or instances thereof, on a plant, plant organ, plant part, plant propagation material or the soil surrounding said plant and includes antibacterial agents, fungicides, herbicides, and insecticides.

The term "active pesticidal ingredient" as herein refers to a compound that is effective as a pesticide.

The term "plant organ" as used herein refers to the leaf, stem, root, and reproductive structures.

The term "plant part" as used herein refers to a vegetative plant material such as a cutting or a tuber; a leaf, flower, bark or a stem.

The term "plant propagation material" as used herein refers to a seed, root, fruit, tuber, bulb, rhizome, or part of a plant.

The term "pesticidal effective amount" as used herein refers to an amount of the pesticide that is effective for controlling, preventing, reducing or eradicating plant-pathogen infestation or instances thereof, on a plant, plant organ, plant part, plant propagation material or the soil surrounding said plant.

The terms "class", "order", "family", "genus", and "species" are used herein according to Art 3.1 of the International Code of Nomenclature for algae, fungi, and plants.

The term "comprising", used in the claims, is "open ended" and means the elements recited, or their equivalent in structure or function, plus any other element or elements which are not recited. It should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a composition comprising x and z" should not be limited to compositions consisting only of compounds x and z. Also, the scope of the expression "a method comprising the steps x and z" should not be limited to methods consisting only of these steps.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Unless otherwise indicated, all numbers used in this specification are to be understood as being modified in all instances by the term "about". Unless specifically stated, as used herein, the term "about" is understood as within a range of normal tolerance in the art, for example within two standard deviations of the mean. In one embodiment, the term "about" means within 10% of the reported numerical value of the number with which it is being used, preferably within 5% of the reported numerical value. For example, the term "about" can be immediately understood as within 10%, 9%, 8%, 7%, 6%, 5%, 4%, 3%, 2%, 1%, 0.5%, 0.1%, 0.05%, or 0.01% of the stated value. In other embodiments, the term "about" can mean a higher tolerance of variation depending on for instance the experimental technique used. Said variations of a specified value are understood by the skilled person and are within the context of the present invention. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges, for example from 1-3, from 2-4, and from 3-5, as well as 1, 2, 3, 4, 5, or 6, individually. This same principle applies to ranges reciting only one numerical value as a minimum or a maximum. Unless otherwise clear from context, all numerical values provided herein are modified by the term "about". Other similar terms, such as "substantially", "generally", "up to" and the like are to be construed as modifying a term or value such that it is not an absolute. Such terms will be defined by the circumstances and the terms that they modify as those terms are understood by those of skilled in the art. This includes, at very least, the degree of expected experimental error, technical error and instrumental error for a given experiment, technique or an instrument used to measure a value.

The invention will now be illustrated by the following non-limiting Examples.

EXAMPLES

List of abbreviations

RPM—Revolutions per minute
RCF—Relative centrifugal force
CFU—Colony forming unit
PDBC—Potato dextrose broth with 20 ug/ml chloramphenicol
PDAC—Potato dextrose agar with 20 ug/ml chloramphenicol
PDAT Potato dextrose agar with 12 ug/ml tetracycline
DMSO—Dimethyl sulfoxide
LB—Lysogeny broth
LBA—Lysogeny broth with agar
SCH—Schmittner medium
2:PDBC—PDBC diluted 2 fold by sterile distilled water
PDA—Potato dextrose agar
PDBT—Potato dextrose broth with 12 ug/ml tetracycline Example 1. Microplate Based Assay of Pinocembrin Dihydrochalcone Bioactivity Against *Fusarium oxysporum*

Summary:
Diluted purified pinocembrin dihydrochalcone was added to microplate wells and mixed with freshly prepared spore suspension and growth of the fungus, starting from frozen spores, was monitored by plate reader and visual inspection.
Background:
*Fusarium* is a fungus of belonging to the Ascomycetes, and it is a soil borne pathogen. It is quite easy to produce large amounts of spores of *Fusarium*, and they survive in liquid 60% glycerol at −20° C., that led to decision to use frozen spores' stock in this screening rather than prepare fresh spores for each experiment.
Aim:
To determine the effect of different compounds on the survival and growth of *Fusarium*.
The following Materials, methods and equipment were used:
Materials: PDAC (Becton, Dickinson and Company, NJ, US), PDBC (Becton, Dickinson and Company, NJ, US), DMSO (J. T. Baker, Part of Fisher Scientific, US).
Equipment: Plate reader, Centrifuge, Shaker, Incubator
Method:
*Fusarium* Spore Suspension Preparation:
1) Put agar block of growing *fusarium* on PDAC in the middle of a PDAC plate and grow for 9 days at 25° C.
2) Chill the plate in the fridge for at least 1 h.
3) Add 30 ml of fridge cold, sterile, 60% glycerol solution to the 50 ml tube.
4) Cut the agar with the hyphae and spores from one plate to small pieces by scalpel and insert them into the 50 ml tube with 30 ml 60% glycerol.
5) Shake for 1 min at 3000 RPM.
6) Keep spores on ice during the whole process.
7) Transfer the liquid to a new 50 ml sterile tube—about 25 ml should be recovered.
8) Filter the spore suspension through 16 layer of gauze cloth directly into a clean sterile 50 ml tube to discard the hyphae.
9) Calculate the spore concentration (count ×10 dilution at 40×10 magnification) and dilute by cold sterile 60% glycerol solution to get $2\times10^5$ spores/ml.
10) Aliquot 1 ml of spore suspension into 1.5 ml tubes—each aliquot should yield 20 plates for screening.
11) Store the spore suspension at −20° C.
Spore Suspension Preparation for Screening:
1) Take 1 ml frozen spore suspension from the freezer and thaw it on ice.
2) Mix 200 ul spore suspension with 20 ml fridge cold PDBC in a 50 ml tube to make 2000 spores/ml suspension.
3) Use this amount to screening of 4 microplates with 100 spores per well.
Microplate Preparation for Screening Experiment:
1) Take a stock solution of purified 1% Pinocembrin dihydrochalcone in DMSO from the freezer and thaw it on the bench.
2) Take 1 ul of the stock solution of 1% Pinocembrin dihydrochalcone and dilute up to 250 ppm with 39 ul of water.

3) 3) Take 10 ul of the diluted (250 ppm) Pinocembrin dihydrochalcone solution into the wells of the microplate using a multi-pipette.
4) 4) Add 40 ul of vigorously mixed spore suspension *inoculum* to the wells of the microplate using a multi-pipette.
5) Seal the plate with transparent sealer.
6) Shake the plate for 10 min at 2000 RPM to mix the materials with the hyphae suspension.
7) Centrifuge the plate at 1000RCF for 1 s and stop to collect the liquid at the bottom of the plate.
8) Keep the microplate on the bench until it is read by the plate reader.
9) Read the plate using the plate reader.
10) Collect the plates on the bench.
11) Insert collected plates to a plastic box with cloth cover and put the box in the incubator at 25° C.

Readout of the Plates:
1) Collect the readout of the plate at 3 more dates: 3 d, 7 d, 14 d and 21 d following the assay start.
2) Calculate the difference of absorbance between each readout and the readout at zero time.
3) Calculate the percentage of growth inhibition of each well at each time course. Use the results of the DMSO treatment, of the control plate as 100% growth.
4) Results: Please see Example 10.

Example 2. Microplate Based Assay of Pinocembrin Dihydrochalcone Bioactivity Against *Rhizoctonia Solani*

Summary:

Diluted purified pinocembrin dihydrochalcone was added to microplate wells and mixed with 50 ul of hyphae suspension and growth of the fungus starting from blended hyphae was monitored by plate reader and visual inspection.

The following materials, methods and equipment were used:
Materials: PDAC (from Becton, Dickinson and Company, NJ, US), PDBC (from Becton, Dickinson and Company, NJ, US), DMSO (from J. T. Baker, Part of Fisher Scientific, US)
Equipment: Plate reader, Centrifuge, Shaker, Incubator Method:
*Inoculum* Preparation of *Rhizoctonia solani* Hyphae:
1) Grow *Rhizoctonia* on PDAC in 90 mm petri plates to get growing hyphae within 1-4 days.
2) Add 50 ml of PDBC medium into a sterile 250 ml Erlenmeyer flask.
3) Cut the solid medium by scalpel to several small pieces and insert them into the Erlenmeyer flask.
4) Grow the culture for 2-4 days using shaker at 27° C. and 150 RPM.
5) Discard the liquid and pour the hyphae in an empty Petri dish.
6) Cut many small pieces from the hyphae using a scalpel and insert them into a sterile 250 ml Erlenmeyer flask with 50 ml of PDBC medium.
7) Prepare 4 bottles with culture and grow for 3 days at 27° C. shaking at 150 RPM.
8) Chill the culture in the fridge for 1 h.
9) Pour the cold culture into a 250 ml beaker.
10) Add 20 ml of cold PDBC.
11) Blend the culture with a blender for 2 min on ice at maximum speed, move the blender up and down several times.
12) Keep the mixture on ice.
13) Transfer about 5 ml of the blended mixture into a 15 ml tube on ice.
14) Homogenize the culture in the 15 ml tube for 2 min on ice.
15) Homogenize several batches of 5 ml as above to prepare the amount that is needed (5 ml of homogenized culture would make about 100 ml of *inoculum*).
16) Dilute a portion of the homogenate 10-fold to check the concentration of the homogenate. The concentration of the suspension should be $4 \times 10^4$ CFU/ml (diluted 10-fold concentration should be 4000 CFU/ml).
17) Dilute the *inoculum* stock 1:20 in PDBC—1 ml in 20 ml, or calculate the dilution needed, to prepare final concentration of 2000 CFU/ml. The amount in each well should be 100 CFU.

Microplate Preparation for Activity Experiment:
1) Take a stock solution of purified 1% Pinocembrin dihydrochalcone in DMSO from the freezer and thaw it on the bench.
2) Take 1 ul of stock solution of 1% Pinocembrin dihydrochalcone and dilute up to 250 ppm with 39 ul of water.
3) Take 10 ul of the diluted (250 ppm) Pinocembrin dihydrochalcone solution into the wells of the microplate using a multi-pipette.
4) Add 40 ul of vigorously mixed spore suspension *inoculum* to the wells of the microplate using a multi-pipette.
5) Seal the plate with transparent sealer.
6) Shake the plate for 10 min at 2000 RPM to mix the pinocembrin dihydrochalcone with the hyphae suspension.
7) Centrifugate the plate at 1000RCF for 1 s and stop to collect the liquid at the bottom of the plate.
8) Keep the microplate on the bench until it is read by the plate reader.
9) Read the plate using the plate reader.
10) Collect the plates on the bench.
11) Insert collected plates to a plastic box with cloth cover and put the box in the incubator at 27° C.

Screening of Plates:
1) Screen plate at 3 more dates: 3 d, 7 d, 14 d and 21 d following the assay start.
2) Calculate the difference of absorbance between each screen and the read at zero time.
3) Calculate the percentage of growth inhibition of each well at each time point. Use the results of the DMSO treatment of the control plate as 100% growth.
4) Results: Please see Example 10.

Example 3. Microplate Based Assay of Pinocembrin Dihydrochalcone Bioactivity Against *Pythium aphanidermatum*

Summary:

Diluted purified pinocembrin dihydrochalcone was added to microplate wells and mixed with 50 ul of zoospores in PDBC suspension and the growth of the fungus, starting from zoospores, was monitored by plate reader and visual inspection.

The following Materials, methods and equipment were used:
Materials:
SCH, PDBC (from Becton, Dickinson and Company, NJ, US), DMSO (from J. T. Baker, Part of Fisher Scientific, US)

Equipment:
Plate reader, Centrifuge, Shaker, Incubator

Method:

*Inoculum* Preparation of *Pythium* Hyphae:
1) Grow *Pythium aphanidermatum* on SCH in 90 mm petri plates to get sporulating hyphae. Each plate will produce 50 ml of zoospores suspension which will yield ten 96-well plates.
2) Add 60 ml of sterile $H_2O$ into a sterile 250 ml Erlenmeyer flask.
3) Cut the solid medium of 2 plates by scalpel to 12 pieces (each plate) and insert them into the Erlenmeyer flask (the solid pieces should be covered by the water).
4) Let the hyphae sporulate overnight at 17° C.
5) Shake the Erlenmeyer flask by hand to suspend the zoospores.
6) Filter the suspension into 50 ml tube through 16-layer gauze.
7) Transfer the suspension into a sterile 500 ml bottle.
8) Discard the solids and disinfect the Erlenmeyer flask with hypochlorite.
9) Chill the zoospore suspension on ice.
10) Evaluate the zoospores concentration in the suspension (the concentration should be in the range of 1000-4000 spores/ml).
11) Dilute the suspension by sterile fridge cold distilled $H_2O$ in a sterile 500 ml bottle if needed.
12) Add the same volume (as the suspension) sterile fridge cold 2-fold concentrated PDBC to get 500-2000 spores/ml *inoculum*. This dilution will result in the amount of 25-100 zoospores in each well.
13) Keep the zoospore suspension *inoculum* on ice.

Microplate Preparation for Activity Experiment:
1) Take a stock solution of purified 1% Pinocembrin dihydrochalcone in DMSO from the freezer and thaw it on the bench.
2) Take 1 ul of stock solution of 1% Pinocembrin dihydrochalcone and dilute up to 250 ppm with 39 ul of water.
3) Take 10 ul of the diluted (250 ppm) Pinocembrin dihydrochalcone solution into the wells of the microplate using a multi-pipette.
4) Add 40 ul of vigorously mixed spore suspension *inoculum* to the wells of the microplate using a multi-pipette.
5) Seal the plate with transparent sealer.
6) Shake the plate for 10 min at 2000 RPM to mix the pinocembrin dihydrochalcone with the hyphae suspension.
7) Centrifugate the plate at 1000RCF for 1 s and stop to collect the liquid at the bottom of the plate.
8) Keep the microplate on the bench until it is read by the plate reader.
9) Read the plate using the plate reader.
10) Collect the plates on the bench.
11) Insert collected plates to a plastic box with cloth cover and put the box in the incubator at 27° C.

Screening of the Plates:
1) Read out the plate at 3 more dates: 3 d, 7 d, 14 d and 21 d following the assay start.
2) Calculate the difference of absorbance between each readout and the readout at zero time.
3) Calculate the percentage of growth inhibition of each well at each time point. Use the results of the DMSO treatment of the control plate as 100% growth.
4) Results: Please see Example 10.

Example 4. Microplate-Based Screening of Pinocembrin Dihydrochalcone Against *Phytophthora infestans*

Background: *Phytophthora infestans* is an obligatory pathogen from Oomycetes which is very difficult to grow on synthetic medium. Therefore, the bioactivity screening system based on leaf discs prepared from detached tomato leaves were used.

Summary: pinocembrin dihydrochalcone was dissolved in DMSO were added to tomato leaf discs infected with *Phytophthora* and the disease progress was monitored by visual inspection.

General description: Inoculation and maintenance on tomato leaves, preparation of spore suspension, their growth on leaf discs in microplates and inspection by magnifying glass of *Phytophthora infestans* severity of infection.

The Following Materials, Methods and Equipment were Used:

Method:

A. Preparation of Tomato Seedling for Leaves Production for Inoculation

1) Use seedling pots of size 120×80×80.
2) Use standard garden earth with fertilizer.
3) Use 4 weeks old tomato seedlings.
4) Put 6 pots in a small tray.
5) Put one seedling in each pot.
6) Add water into the tray—about 100 ml for each pot. Earth should be wet, and no water should be left in the trey after 24 h.
7) Grow the tomato plants in growth room at 22° C. and 16 h light/darkness conditions.
8) When plants are grown (4 weeks after planting) transfer them to a 5 L pot and fertilize every week with.

B. Preparation of Tomato Leaves for Inoculation

1) Put two pieces of sterile paper in a square Petri dish.
2) Work in sterile conditions.
3) Use leaves of 5 weeks old tomato plants or older.
4) Cut the leaves by a sterile scalpel.
5) Add 20 ml sterile distilled water to wet the paper (the paper should be maximally wet, but without additional dripping water).
6) Put about 6 lobes of leaves in a square Petri dish, on the wet paper (with the lower side of the leaves up).
7) Cover the plate with its lid.

C. Preparation of *Inoculum* and Leaf Discs Infection

Preparation of Sporangium Suspension

1) Put 10 lobes of tomato leaf infected with *Phytophthora* (4-6 days after infection), in a sterile 50 ml tube, fill in 40 ml of fridge cold, sterile, distilled water.
2) Mix the tube gently by hand, to transfer sporangium into the water, but avoid disintegration of the leaf.
3) Filter the spore suspension through 16 layers of gauze into a 50-ml tube.
4) Calculate the spore concentration—use microscope with 200× magnification. A concentration of 6000 sporangium/ml is expected.
5) Chill the tube on ice.

D. Sporangium Wash and Concentration by Filtration

1) Prepare filtration system with membrane (0.65 micron-5 micron) and wash the membrane with sterile cold water.
2) Suspend and decant the spore suspension from the 50 ml tube slowly, into the filtration system. Use low vacuum, don't let the membrane dry—leave 4 ml unfiltered suspension on the filter.
3) Wash the spores to discard bacteria and other fungi spores (use 40 ml water to wash)—spray cold sterile water to suspend and wash the spores.
4) Repeat spore wash 5 more times. Do not let the membrane dry. Leave 4 ml unfiltered suspension.
5) Collect the spore suspension using a 1000 ul pipette into a clean 50-ml tube.
6) Insert the membrane into the 50-ml tube mix gently to suspend the sporangium, which stick to the membrane.
7) Discard the membrane to be autoclaved.
8) Discard liquid, and disinfect the filtration system using hypochlorite for 30 min.
9) Wash the filtration system with tap water and dry the filtration system on a paper in a plastic basket.
10) Calculate the sporangium concentration—use microscope with 200× magnification—10,000-50,000 sporangium/ml concentration is expected.
11) Keep the sporangium suspension on ice.

E. Inoculation of Spores on Detached Leaves for Maintenance of *Phytophthora*
1) Spray 1000 μl of *Phytophthora* spore suspension on all the lobes of leaves in one square dish and cover the dish.
2) Infect the leaves with the fungus on and keep the leaves into the incubator at 17° C. in the dark for 24 h.
3) Transfer the plates for additional 3-5 days into the incubator at 22° C., with 12 h light, for sporangium growth.

F. Tomato Leaf Discs Microplate Preparation for Screening

1) Take the 48 wells plate.
2) Prepare sterile water agar 0.5%, use it preheated, but cold.
3) Add 100 μl sterile water agar 0.5% to the microplate wells.
4) Put tomato leaf discs prepared from $3^{rd}$, $4^{th}$ or $5^{th}$ leaf, into microplate wells. Press the discs gently to ensure maximal contact with the liquid agar solution.

G. Inoculation of Spores on Leaf Discs Microplate for Pinocembrin Dihydrochalcone Efficacy Evaluation 1) Insert the spore suspension into the microplate for testing.
2) Seal the chemicals microplate with transparent sealer.
3) Shake the microplate for 10 min at 2000 RPM to mix the materials with the added spore suspension.
4) Centrifugate the microplate at 1000 RCF for 1 s and stop to collect the liquid at the bottom of the plate.
5) Add 5 μl spore suspension onto the middle of each disc of the microplate.
6) Seal the leaf discs plate with transparent sealer.
7) Insert the sealed leaf discs plates into the incubator at 17° C. for 24 h in the dark and then at 22° C., with 12 h light/darkness regime for 3-5 days.
8) Perform the bioactivity evaluation.

H. Bioactivity Evaluation

1) Screen plate at one time point: 5 days after suspension preparation using a ×5 magnification glass.
2) Report infected discs in Excel sheet:

Type 1—if discs are fully infected;
Type 2—inconclusive;
Type 3—if discs are not infected at all.

3) Calculate the number of repeats of scores of 3 for each material.
4) Calculate the sum of scores of 3 for each material.
5) Best score was calculated as following: number of repeats=4, sum of scores=12.
6) "Hits" are those materials which have 4 or 3 repeats, and sum of 6-12. See results in Example 10.

Example 5. Microplate-Based Screening of Pinocembrin Dihydrochalcone Against *Pseudoperonospora cubensis*

Background: *Pseudoperonospora cubensis* is an obligatory pathogen from Oomycetes which is very difficult to grow on synthetic medium. Therefore, the bioactivity screening system based on leaf discs prepared from detached cucumber leaves were used.

Summary: Pinocembrin dihydrochalcone was dissolved in DMSO was added to cucumber leaf discs infected with *Pseudoperonospora* and the disease progress was monitored by visual inspection.

General description: Inoculation and maintenance on cucumber leaves, preparation of spore suspension, their growth on leaf discs in microplates and inspection by magnifying glass of *Pseudoperonospora cubensis* severity of infection.

The Following Materials, Methods and Equipment were Used:

Method:

Preparation of Cucumber Seedling for Leaves Production for Inoculation

1) Grow plants, in the growth room (27° C.), high light radiation.
2) Use standard garden soil.
3) Plant cucumber seeds.
4) Add fertilizer once a week.

Preparation of Cucumber Leaves for Inoculation

1) Put 3 (double) pieces of sterile paper in a square Petri dish.
2) Work in sterile conditions.
3) Use leaves from healthy plants. The leaves should be young and healthy, their size should fit to the square plate.
4) Cut the leaves by a sterile scalpel, leaving a long stem.
5) Add 10 ml sterile distilled water to wet the paper (the paper should be maximally wet, but without additional dripping water), discard excess of water. (High humidity will cause to growth of other undesired pathogens).
6) Fold the wet paper around the stem.
7) Put the leaf in a square Petri dish, abaxial side of the leaf up.
8) Cover the plate with its lid, but don't seal with nylon.
10) Add water every 2 days.

Preparation of *Inoculum* for Leaves and Leaf Discs Infection

1) Put cucumber leaf, infected with *Pseudoperonospora* (5-7 days after infection) in a sterile 50 ml tube, fill with 40 ml of fridge cold, sterile, distilled water.
2) Mix the tube gently by hand, or by vortex, to transfer sporangium into the water.
3) Filter the spore suspension through 16 layers of gauze into a 50 ml tube.
4) Collect the sporangium on a 5 micron membrane, and wash with sterile water.
5) Insert the membrane with the sporangium into a sterile 50 ml tube.
6) Add 5 ml sterile water into the tube to wash the spores from the membrane.
7) Calculate the spore concentration—use microscope with 200× magnification. A concentration of 100,000 sporangium/ml is expected (10 sporangium cells in the counting chamber middle square).

8) Dilute the spore suspension to get a concentration of 50,000 sporangium/ml.
9) Keep the tube on ice.
10) Use this suspension for inoculation.

Cucumber Leaf Discs Microplate Preparation for Efficacy Evaluation:
1) Take a plate of 48 wells.
2) Prepare sterile water agar 0.5%, use it preheated, but cooled.
3) Add 200 ul sterile water agar 0.5% to the wells of the microplate.
4) Prepare leaf discs from cucumber leaves (same as used for the plates-young and healthy leaves).
5) Prepare the leaf discs immediately after cutting the leaves from the plant.
6) Insert into the wells of the plate, leaf discs with diameter as the well diameter (abaxial side of the leaf up). press the discs gently to ensure maximal contact with the liquid agar solution.
7) Do not seal with nylon.

Inoculation of Spores on Detached Leaves for Maintenance of *Pseudoperonospora cubensis*
1) Use a 200 ul pipette to apply small drops of *Pseudoperonospora cubensis* spore suspension on the leaf. Apply 600 ul suspension on one leaf.
2) Cover the dish don't seal it.
3) Insert the fungus on the leaves, into the incubator at 17° C. (the optimum is 18-22° C.), in the dark, for about 24 h, for the penetration stage.
4) Transfer the plates (not sealed) for additional 5-7 days into the incubator at 23° C., with 12 h light, for the growth and sporangium production.
5) Leaves should be infected, and the fungus should inoculate the leaf and cause yellow spots after 5 days with the following sporulation after 7 days.
6) The fungus should be viable for several days.
7) Store plates with sporangium in the fridge (not sealed, without water).

Inoculation of Spores on Leaf Disc in Microplates
1) Use spore suspension *inoculum*, as described above.
2) Mix 80 ul spore suspension with 20 ul material solution (control or pinocembrin dihydrochalcone) in a 1.5 ml tube or in a flat bottom 96 well plate.
3) For mixing 1.5 ml tubes—mix by vortex and pipette.
4) For mixing flat bottom 96 well plate:
a. Seal the chemicals microplate with transparent sealer,
b. Shake the chemicals microplate for 10 min at 2000 RPM to mix the materials with the added spore suspension.
c. Centrifugate the chemicals microplate at 1000RCF for 1 s and stop, to collect the liquid at the bottom of the plate.
5) Add 10 ul spore suspension onto the middle of each disc of the microplate, using a pipette. Don't seal the leaf discs plate.
6) Insert the leaf discs plates (not sealed) into the incubator (as for maintenance in plates) at 17° C. for 24 h in the dark and then at 23° C., with 12 h light, for 6 more days.
7) Screen for uninfected leaf discs after 7 days from inoculation.

Fungal Growth Evaluation:
1) Perform the fungal growth evaluation 7 days after inoculation
2) Use a lamp for visual assessment of compounds effect on fungal growth overtime.
3) Perform visual evaluation of the plates after removing their cover, or by inspection of the back of the plate.
4) Compare the hyphal growth of each well to the hyphal growth of the control plate wells (wells containing active fungicides or DMSO solution).
5) Write the results on a special form: no symptoms on the leaf=3 (no growth of the fungus), yellow spots at the back, or gray mycelium on the abaxial side=0 (normal infection), inconclusive=2 (pale green, or other unexpected texture).

See results in Example 10.

Example 6. Microplate Based Assay of Pinocembrin Dihydrochalcone Bioactivity Against *Sclerotinia sclerotiorum*

Summary:
Diluted purified pinocembrin dihydrochalcone was added to microplate wells and mixed with 50 ul of hyphae suspension and growth of the fungus starting from blended hyphae was monitored by visual inspection.

Background:
*Sclerotinia sclerotiorum* is a fungus of belonging to the Ascomycetes and it is a soil borne pathogen. It is difficult to produce large amounts of spores of *Sclerotinia sclerotiorum*, that led to decision to use hyphae in this screening rather than spores for inoculation.

The Following Materials, Methods and Equipment were Used:
Materials: PDAC (from Becton, Dickinson and Company, NJ, US), PDBC (from Becton, Dickinson and Company, NJ, US), DMSO (from J. T. Baker, Part of Fisher Scientific, US) PDBC (PDB is from Becton, Dickinson and Company, NJ, US; chloramphenicol is from Alfa Aesar, part of Thermo Fisher Scientific), PDA (from Becton, Dickinson and Company, NJ, US), PDAT (PDA is from Becton, Dickinson and Company, NJ, US; tetracycline is from Alfa Aesar, part of Thermo Fisher Scientific), PDBT (PDB is from Becton, Dickinson and Company, NJ, US; tetracycline is from Alfa Aesar, part of Thermo Fisher Scientific), DMSO (from J. T. Baker, Part of Fisher Scientific, US).
Equipment: Centrifuge, Shaker, Incubator
Methods:

*Inoculum* Preparation of *Sclerotinia sclerotiorum* Hyphae:
1) Grow *Sclerotinia sclerotiorum* on PDA in tube at 21° C. for 4 days.
2) Transfer agar block and grow *Sclerotinia sclerotiorum* on PDAT in 90 mm Petri dishes at 21° C. to get growing hyphae within 3 days.
3) Add 50 ml of PDBT medium into a sterile 250 ml square flask.
4) Cut the solid medium by scalpel to 15 very small pieces (1×5 mm) and insert them into the square flask.
5) Grow the culture for 2 days using shaker at 21° C. and 130 RPM.
6) Discard the liquid and pour the hyphae on an empty Petri dish.
7) Cut many small pieces from the hyphae (avoid using the agar pieces) using a scalpel and insert them into a sterile 250 ml square flask containing 50 ml of PDBT medium.
8) Grow for 2 days at 21° C., shaking at 130 RPM to get fast growing dispersed hyphae.
9) Chill the culture in the fridge for 1 hour.
10) Pour the cold culture into a 50 ml tube.
11) Keep the mixture on ice.

12) Transfer about 5 ml of the blended mixture into a 15 ml tube on ice.
13) Homogenize the culture in the 15 ml tube for 2 min on ice.
14) Homogenize several batches of 5 ml as above to prepare the amount that is needed (5 ml of homogenized culture would make about 50 ml of *inoculum*).
15) Dilute a portion of the homogenate 10-fold to check the concentration of the homogenate. the concentration of the suspension should be $2 \times 10^4$ CFU/ml (diluted 10-fold concentration should be 2000 CFU/ml).
16) Dilute the *inoculum* stock 1:10 in PDBC—2 ml in 20 ml, or calculate the dilution needed, to prepare final concentration of 2000 CFU/ml. The final number of hyphae should be 100 CFU in each well.

Microplate Preparation for Activity Experiment:
1) Take a stock solution of purified 1% Pinocembrin dihydrochalcone in DMSO from the freezer and thaw it on the bench.
2) Take 1 ul of stock solution of 1% Pinocembrin dihydrochalcone and dilute up to 250 ppm with 39 ul of water.
3) Take 10 ul of the diluted (250 ppm) Pinocembrin dihydrochalcone solution into the wells of the microplate using a multi-pipette.
4) Add 40 ul of vigorously mixed spore suspension *inoculum* to the wells of the microplate using a multi-pipette.
5) Seal the plate with transparent sealer.
6) Shake the plate for 10 min at 2000 RPM to mix the pinocembrin dihydrochalcone with the hyphae suspension.
7) Centrifuge the plate at 1000RCF for 1 s and stop to collect the liquid at the bottom of the plate.
8) Collect the plates on the bench until all microplates are ready for incubation.
9) Insert microplates into a plastic box and put the box in the incubator at 21° C.

Screening of Plates:
1) Screen plate at 5 dates: 4, 7, 14 and 21 days after inoculation.
2) Use a lamp for visual assessment of compounds effect on fungal growth overtime.
3) Screen plates after removing their cover, if there is liquid on the cover (from inside) evaporate the liquid by a heated block at 60° C.
4) Compare the hyphal growth of each well to the hyphal growth of the control plate wells (wells containing active fungicides or 0.5% DMSO solution).
5) Write the results on a special form: clear well=3 (no growth of hyphae), normal hyphal structure=1 (normal growth), inconclusive=2 (solid structure of unexpected type, or partial cover of the area).
6) Results: Please see Example 10.

Example 7. Microplate Based Assay of Pinocembrin Dihydrochalcone Bioactivity Against *Pseudomonas syringae* and *Xanthomonas campestris*

Summary:
Diluted purified pinocembrin dihydrochalcone was added to microplate wells and mixed with 100 ul of frozen bacteria suspension and growth of the bacteria was monitored by visual inspection.

Background:
Frozen bacteria stock of 60% glycerol is used as an *inoculum* for the screening experiments.

The Following Materials, Methods and Equipment were Used:
Materials: LB (from Becton, Dickinson and Company, NJ, US), LBA (from Becton, Dickinson and Company, NJ, US), DMSO (from J. T. Baker, Part of Fisher Scientific, US)
Equipment: Centrifuge, Shaker, Incubator Method:
Bacterial Suspension Preparation:
1) Grow bacteria on LBA plates at 28° C. for 2 days to get a single colony.
2) Transfer a single colony using a sterile toothpick into a 50 ml sterile tube containing 5 ml LB and grow for 24 at 28° C. and 150 RPM.
3) Chill the tube in the fridge for 1 h.
4) Add 7.5 ml of fridge cold, sterile, glycerol solution to the tube to get 60% glycerol solution.
5) Mix well but gently.
6) Aliquot 100 ul of bacteria suspension in 60% glycerol into 1.5 ml tubes.
7) Store the bacteria suspension in 60% glycerol at −20° C.

Bacterial Suspension Preparation for Screening:
1) Take 1.5 ml tube with 100 ul frozen bacterial suspension from the freezer and thaw it on ice.
2) Prepare in the hood 50 ml tubes with 40 ml fridge cold LB.
3) Mix 40 ul of bacterial suspension with 40 ml fridge cold LB in a 50 ml tube. This amount is enough for activity screening of 10 microplates.
4) Use this suspension for the screening experiments.

Microplate Preparation for Activity Experiment:
1) Take a stock solution of purified 1% Pinocembrin dihydrochalcone in DMSO from the freezer and thaw it on the bench.
2) Take 1 ul of stock solution of 1% Pinocembrin dihydrochalcone and dilute up to 250 ppm with 39 μl of water.
3) Take 10 ul of the diluted (250 ppm) Pinocembrin dihydrochalcone solution into the wells of the microplate using a multi-pipette.
4) Add 40 ul of vigorously mixed bacterial suspension *inoculum* to the wells of the microplate using a multi-pipette.
5) Seal the plate with transparent sealer.
6) Shake the plate for 10 min at 2000 RPM to mix the Pinocembrin dihydrochalcone with the bacteria suspension.
7) Centrifugate the plate at 1000RCF for 1 s and stop to collect the liquid at the bottom of the plate.
8) Insert the plates to a plastic box with cover and put the box in the incubator at 28° C.

Screening of Microplates:
1) Screen the microplate at 5 dates: 3, 5, 7, 14 and 21 days after inoculation.
2) Use a lamp to visually evaluate the bacterial growth.
3) Prepare plates for screening: shake plate at 2000 RPM for 2 min to suspend the bacteria and then centrifuge plate at 1000RCF for a few seconds.
4) Screen the microplates after removing their cover.
5) Compare the transparency of each well to the transparency of the control wells (wells containing control bactericide or 0.5% DMSO solution).

Write the results on a special form: clear=3 (no growth of bacteria), turbid=1(normal bacterial growth), inconclusive=2 (very low turbidity compared to growth in 0.5% DMSO solution).
6) Results: Please see Example 10.

Example 8. Microplate Based Assay of Pinocembrin Dihydrochalcone Bioactivity Against *Pectobacterium carotovorum*

Summary:
Diluted purified pinocembrin dihydrochalcone was added to microplate wells and mixed with 50 ul of frozen bacteria suspension and growth of the bacteria was monitored by visual inspection.
Background:
*Pectobacterium carotovorum*, a rod-shaped Gram-negative bacterium, is a major plant pathogen and cause large damage to many agricultural crops. Frozen bacteria stock in 60% glycerol was used as an *inoculum* for the screening experiment.
Aim:
To determine the effect of different compounds on the survival and growth of *Pectobacterium carotovorum*.
Materials: LB (from Becton, Dickinson and Company, NJ, US), LBA (from Becton, Dickinson and Company, NJ, US), DMSO (from J. T. Baker, Part of Fisher Scientific, US)
Equipment: Centrifuge, Shaker, Incubator
Method:
*Pectobacterium* Suspension Preparation:
 1) Grow *Pectobacterium* on LBA plates at 28° C. for 2 days, to get a single colony.
 2) Transfer a single colony, using a sterile toothstick, into a 50 ml sterile tube containing 5 ml LB, and grow for 24 at 28° C., 150 RPM.
 3) Chill the tube in the fridge for more than 1 h.
 4) Add 7.5 ml of fridge cold, sterile, glycerol solution to the tube to get 60% glycerol solution.
 5) Mix well, but gently.
 6) Aliquot 100 ul of bacteria suspension in 60% glycerol into 1.5 ml tubes—each aliquot should yield quantity enough to screen 10 microplates.
 7) Store the bacteria suspension in 60% glycerol at −20° C.
*Pectobacterium* Suspension Preparation for Screening:
 1) Take 1.5 ml tube of (with 100 ul) frozen *Pectobacterium* suspension from the freezer and thaw it on ice.
 2) Prepare in the hood 50 ml tubes with 40 ml fridge cold LB broth diluted 8-fold with sterile water.
 3) Mix 8 ul of bacteria suspension with 40 ml fridge cold diluted LB broth in a 50 ml tube to make ready-to-use *Pectobacterium* suspension with growth medium.
 4) Keep on ice.
 5) Use this suspension for screening experiments.
Microplate Preparation for Screening Experiment:
 1) Take a stock solution of purified 1% Pinocembrin dihydrochalcone in DMSO from the freezer and thaw it on the bench.
 2) Take 1 μl of stock solution of 1% Pinocembrin dihydrochalcone and dilute up to 250 ppm with 39 ul of water.
 3) Take 10 μl of the diluted (250 ppm) Pinocembrin dihydrochalcone solution into the wells of the microplate using a multi-pipette.
 4) Add 40 μl of vigorously mixed bacterial suspension *inoculum* to the wells of the microplate using a multi-pipette.
 5) Seal the plate with transparent sealer.
 6) Shake the plate for 10 min at 2000 RPM to mix the materials with the bacteria suspension.
 7) Centrifuge the plate at 1000 RCF for 1 s and stop to collect the liquid at the bottom of the plate.
 8) Insert the plates to a plastic box, with cover and put the box in the incubator at 28° C.
Screening of Microplates:
 1) Screen the microplate at 5 dates: 3, 5, 7, 14 and 21 days after inoculation.
 2) Use a lamp to visually evaluate the bacterial growth.
 3) Prepare plates for screening: shake plate at 2000 RPM for 2 min to suspend the bacteria and then centrifuge plate at 1000RCF for 1 s.
 4) Perform visual evaluation of bacterial growth in the microplates after removing their cover.
 5) Compare the transparency of each well to the transparency of the control wells (wells containing active bactericide or 0.5% DMSO solution).
 6) Write the results on a special form: clear=3 (no growth of bacteria), turbid=1(normal bacterial growth), inconclusive=2 (very low turbidity compared to growth in 0.5% DMSO solution).
 7) Results: Please see Example 10.

Example 9. Microplate Based Assay of Pinocembrin Dihydrochalcone Bioactivity Against *Puccinia triticina*

Background:
 *Puccinia triticina* is a fungus of belonging to the Basidiomycetes. *Puccinia* spores were grown on corn plants in a growth room and fresh spore suspension is prepared from the infected corn leaves for each experiment. Since *Puccinia sorghi* is an obligatory pathogen and does not grow on synthetic medium, the germination of the spores was monitored as indication for pinocembrin dihydrochalcone potential bioactivity.
Summary:
 Diluted in DMSO Pinocembrin dihydrochalcone was added separately to microplate wells and mixed with freshly prepared spore suspensions. The germination of the spores was monitored by visual inspection under the microscope.
The Following Materials, Methods and Equipment were Used:
 Materials: Tween20 (Tidea Company INC) non-ionic detergent, DMSO—dimethyl-sulfoxide (J. T. Baker—Poland) solvent, chloramphenicol (Alfa Aesar—UK)
 Equipment: Centrifuge, Shaker, Incubator, Microscope, Filtration system
 General description: inoculation on wheat, collection, preparation of spore suspension, germination in microplates and inspection by microscope of *Puccinia* spores.
Method:
Preparation of Wheat Seedlings for Spores' Production:
 1) Use seedling pots of size 120×100×100.
 2) Use standard garden earth with fertilizer.
 3) Use one of the spring wheat varieties seeds.
 4) Put 12 pots in a large tray.
 5) Fill the pots with the soil to the top and press it a little.
 6) Make a deep grove for the seeds using a 250 ml bottle.
 7) Put about 20 seeds of wheat in each pot.
 8) Cover the seeds with the soil again.
 9) Water the pots 10) Grow the wheat for 14 days in growth room at 24° C. before inoculation.

Preparation of Spore Suspension [from Wheat Leaves] for Inoculation on Plants and for Germination Study
1) Insert 30 wheat leaves with spores into a sterile 50 ml falcon tube.
2) Add 40 ml of cold 0.05% Tween20 solution.
3) Keep the tube on ice.
4) Shake the tube on the vortex for 2 min at maximum speed.
5) Keep the tube on ice.
6) Transfer the suspension (without the leaves) into a clean sterile 50 ml falcon tube.
7) Filter the spore suspension through 16 layers of gauze into a 50 ml falcon tube.
8) Prepare filtration system with 5 micron membrane and wash the membrane with sterile cold water.
9) Suspend and decant the spore suspension from the 50 ml tube slowly, into the filtration system, to the center of the membrane—spores should accumulate on the membrane.
10) Wash the spores to discard bacteria and other fungi spores—stop the vacuum pump and spray cold sterile water to suspend and wash the spores, start the vacuum pump again.
11) Repeat spore wash 4 more times.
12) Suspend the spores in a 50 ml falcon tube with 10 ml sterile cold 0.05% Tween 20 solution; insert the membrane with the spores into the tube with the Tween 20 solution and shake the tube by hand.
13) Remove the membrane and discard it to be autoclaved.
14) Keep the spore suspension on ice.
15) Decant filtered liquid to the sink and wash the filtration system with tap water and dry it.
16) Check the spore concentration in the suspension—the concentration is expected to be 20,000 spore/ml, and should have a brown color. The final concentration should be 4000 spores/ml.
17) Dilute the spore suspension by sterile cold 0.05% Tween 20 solution.

Inoculation of New Seedlings

1) Use 4000 spore/ml suspension for inoculation.
2) Use the compressor paint brush system to apply the *inoculum* on plants.
3) Inoculate 100 ul spore suspension per plant (2 ml for 20 plants).
4) Spray 2 pots at a time on the revolving tray.
5) Put the pots with the inoculated seedlings in a moist chamber with heated water at 17° C. and 99% humidity in the dark for 24 h.
6) After 24 h, transfer the pots to the growth room.
7) Grow the wheat in growth room at 24° C. with 16 h light/8 h dark regime.
8) After 7 days from inoculation, brown spots should be seen on the leaves
9) After 12 days from inoculation leaves with spores can be collected for spore suspension preparation.

Microplate Preparation for Screening of Germinated *Puccinia* Spores:

1) Take a 96 flat bottom well plate and insert 10 ul of the solutions to be tested.
2) Also take a control plate, with materials from the −20° C. freezer and thaw it on the bench, for at least 20 min.
3) Before using the control plate put it into the centrifuge to spin down the liquid on the sealer and walls of the wells (1 min at 1000 RPM).
4) Add 20 ul of *Puccinia* spore suspension (4000 spore/ml) to all wells of the microplates. Suspend the spores by the pipette before transferring the spore suspension into the wells.
5) Mix all flat bottom 96 plates:
   a. Seal the microplate with transparent sealer.
   b. Shake the microplate for 10 min at 2000 RPM to mix the materials with the added spore suspension.
   c. Centrifugate the microplate at 1000RCF for 1 s and stop to collect the liquid at the bottom of the plate.
6) Insert all plates to the dark incubator and incubate at 17° C. for overnight.

Analysis of Plates:

1) Analyze plates 12-24 h after suspension preparation using the microscope at 10×10 magnification
2) Report spore germination in Excel sheet:
   type—0 if spores have germinated properly.
   type—2 if spores have germinated poorly or not normal in any way.
   type—3 if spores have not germinated at all.

See results in Example 10

Example 10. Results of In Vitro Experiments Based on Protocols of Examples 1-9

In-Vitro Screening Matrix

Pinocembrin dihydrochalcone was screened against 11 agricultural pests (as indicated in the table below). The bioactivity values are in % and reflect the potential of eradicating the target pests.

Rules for Bioactivity Relative Value Calculation (Expressed in % from Maximal Value)

a. *Puccinia sorghi, Puccinia triticina, Pseudoperonospora cubensis, Phytophthora infestans*–activity grade (1/2/3)×repeats#/12 (maximal value 3×4=12)×100
b. *Botrytis cinerea, Sclerotinia sclerotiorum Rhizoctonia solani, Fusarium oxysporum, Pythium aphanidermatum*–activity grade (1/2/3)×repeats#×days of activity/252 (maximal value 3×4×21=252)×100
c. *Pseudomonas syringae, Xanthomonas campestris, Pectobacterium carotovorum*–activity grade (1/2/3)×repeats#×days of activity/168 (maximal value 3×4×14=168)×100

TABLE 1

Bioactivity values of 50 ppm Pinocembrin dihydrochalcone on various target pests

| Pathogen | Relative Activity value (%) |
|---|---|
| *Puccinia sorghi* | 0 |
| *Puccinia triticina* | 19 |
| *Phytophthora infestans* | 100 |
| *Botrytis cinerea* | 0 |
| *Rhizoctonia solani* | 6 |
| *Pythium aphanidermatum* | 100 |
| *Pseudoperonospora cubensis* | 50 |
| *Fusarium oxysporum* | 9 |
| *Sclerotinia sclerotiorum* | 6 |
| *Pectobacterium carotovorum* | 12 |
| *Pseudomonas syringae* | 6 |
| *Xanthomonas campestris* | 50 |
| *Mizus Persicae* | 0 |
| *Spodoptera litoralis* | 0 |

In summary, pinocembrin dihydrochalcone is an effective pesticide against the following pests: *Pythium aphanidermatum, Phytophthora infestans, Fusarium oxysporum* (positive results are provided below in in-planta and validation results section), *Rhizoctonia solani, Pseudoperonospora cubensis. Pythium aphanidermatum, Sclerotinia sclerotiorum, Pectobacterium carotovorum, Xanthomonas campestris* and *Pseudomonas syringae*.

Example 11. Formulation Preparation

A. Formulation 3 Preparation Recipe as Used for Experiments Described in FIGS. 1-3

Pinocembrin Dihydrochalcone was dissolved in water to a concentration of 0.1% and pH was adjusted to pH=7.0 with 25% solution of $Na_2CO_3$. The formulation was diluted in the growth medium to get the desired concentration for the experiment.

B. Formulation Preparation Recipe as Used for Experiments Described in FIGS. 4-6
1) Take 200 mg of pinocembrin dihydrochalcone.
2) Use the Pulverisette 23 grinder [50 oscillations/s].
3) Insert into the bowl:
   10 g of 1 mm stainless-steel balls, 2 ml sterile, distilled water, 200 mg of pinocembrin dihydrochalcone, 40 mg KS61 ((mixture of Kelzan® Xanthan Gum (CAS 11138-66-2) and Supragil® MNS/90 CAS 81065-51-2)
4) Grind for 10 min
5) Transfer the mixture and the balls into a clean 50 ml tube.
6) Insert 4 ml sterile, distilled water into the 50 ml tube.
7) Shake vigorously and vortex 10 s.
8) Use 1000 ul pipette to collect 4 ml into a clean new 50 ml tube.
9) Repeat 4 more times steps 6 to 8.
10) The clean 50 ml tube should contain 20 ml of 1% pinocembrin dihydrochalcone suspension, and the tube with the beads should contain 2 ml of diluted mixture to be discarded.
11) Mix by vortex to get homogenic suspension. The formulation was diluted in water to get the desired concentration for the experiment.

Example 12. In Planta Validation of Pinocembrin Dihydrochalcone Treatment of Cucumber Seedlings Infected with *Fusarium oxysporum*

The following materials, methods and equipment were used:
Protocol name: Cucumber seedlings cup system for *Fusarium oxysporum* infection and efficacy testing of compounds Inoculation System Preparation:
1) Use an autoclavable plastic sheet. Cut the plastic sheet to the exact size of the inside of the beaker. Cut 6 holes in the plastic sheet.
2) Use three 1000 ul tips to hold the plastic sheet at the height of 5 mm above the surface liquid medium in the beaker.
3) Add 50 ml distilled water.
4) Add 0.5% of standard fertilizer.
5) Cover the beaker with cloth and rubber ring.
6) Autoclave for 30 min at 121° C.
7) Let the infection system cool in the hood, open the cloth lid and put 3 days old 3-4 cucumber germinating seedlings in 3 holes of the support plastic sheet.
8) Cover the beaker with the cloth lid.
9) Put the infection system in the growth room at 22° C. for 2 days.
10) When the seedlings are 5 days old inoculate with the pathogen—add 1 ml of the pathogen *inoculum* into the growth medium.
11) Put the inoculation system in an incubator with 12 h light, 24° C. regime for 21 days.
12) After about 21 days, check mortality of seedlings (about 100% of untreated seedlings should be dead). Record the number of dead seedlings.

Cucumber Sprouts Preparation:
1) Use square transparent covered plastic plates [12×12 cm].
2) Prepare water agar 2%; insert 8 g agar into a 500 ml bottle and add 400 ml distilled water.
3) Autoclave for 30 min at 121° C.
4) Add 50 ml water agar 2% to the square plate and cover it.
5) Let the agar cool down.
6) Plant 20 cucumber seeds into each plate.
7) Put the plates in an incubator at 27° C. for 3 days.
8) Use the well-developed sprouts for the experiment, when the seedlings are 3 days old. About 80% of the sprouts should have long and branched root at this stage. 9) Pull the sprouts from the agar. No agar should remain on the roots.

*Fusarium* Zoospores Suspension Preparation:
1) Put a PDAT block of *Fusarium* in the middle of a PDAT plate and grow 8 days at 25° C.
2) Chill the plate in the fridge for ~1 h.
3) Cut the agar with the hyphae and spores from one plate to 8 pieces by scalpel, and insert them into a 50 ml sterile tube.
4) Add 25 ml of fridge cold sterile water to the tube.
5) Shake for 1 min at 3000 RPM.
6) Keep spores on ice during the process.
7) Transfer the liquid to a new 50 ml sterile tube—about 25 ml should be recovered.
8) Filter the spore suspension through 16 layer of gauze cloth, directly into a clean sterile 50 ml tube to discard the hyphae. About 20 ml should be recovered.
9) Calculate the spore concentration and dilute by cold sterile water to get $2 \times 10^5$ spores/ml stock.
10) Dilute the spore suspension stock with water to get inoculation spore suspension –500 or 1000 spores/ml.
11) Use immediately to infect the roots of the seedlings—use one ml of spore suspension in 50 ml medium.
12) Add formulated pinocembrin chalcone to medium to get desired concentration.

*Fusarium inoculum* Preparation:
1) Prepare *Fusarium* zoospores.
2) Count under microscope and calculate the zoospore concentration.
3) Dilute the zoospore suspension by cold sterile water to get desired concentration –500 zoospores/ml.
4) Use immediately to infect plants.

Results were evaluated 21 days after infection. Each treatment contained 3-4 cups with 3 seedlings in each. Each pot was evaluated separately by visual assessment and the average of the treatment (average of 3-4 cups) was calculated.

Treatments:
Pinocembrin dihydrochalcone was evaluated at different concentrations (100, 200 and 300 ppm) and was formulated as described in Example 11.

Statistical Analysis for In-Planta Validation Experiments.

To evaluate the effect of a compound in infected plants compared to control plants (infected but not treated) the data was analyzed by Student's t-test and the p value is calcu- Example 13. In-Planta Validation of Pinocembrin Dihydrochalcone Treatment of Cucumber Seedlings Infected with *Pythium aphanidermatum*

General description: cucumber seedlings were grown in seedling tray in soil and inoculated by *Pythium aphanidermatum*. The effect of active materials on the mortality of the plants was monitored.

System Set Up:

1) Sterilize by autoclave, a plastic seedling tray with 30 ml seedling cells.
2) Heat standard garden soil with fertilizer in the oven at 60° C. for 2-3 days.
3) Fill the tray with the soil and let it cool.
4) Plant cucumber seeds.
5) Put the tray with the seeds in the growth room at 27° C. in a tray with water for 3 days.
6) On the 3rd day, fix the seedling tray above the water, to let the soil dry, and to avoid mixing of treatment and inoculums.
7) On the $6^{th}$ day, a mixture of 8 ml of the *inoculum* and the treatment should be applied to the ground by drenching each seedling. The soil should be dry enough at this stage to absorb the 8 ml mixture, the treatment and the pathogen are expected to spread homogenically in the soil.
8) On the $10^{th}$ day, resume irrigation by putting the seedling tray back in the water (infection symptoms are expected to be seen at this stage).
9) Analyze infection results (count dead seedling) on the day 4 after inoculation (step 7).

Preparation of *Inoculum*:

1) Use a 3-days old culture of the *pythium*, grown in quinoa solid phase growth bottle, to prepare a suspension of 0.5% solids in water.
2) Use a stick blender to grind the quinoa seeds with the *Pythium mycelium* in water.
3) Add the treatment to the *inoculum* and apply the mixture to the soil by a pipette.

Preparation of Quinoa Solid Phase Growth Bottle Culture:

1) Insert 10 ml quinoa seeds into a 100 ml bottle. Use a 50 ml tube to measure the volume.
2) Add 10 ml sterile distilled water.
3) Let the seeds absorb the water for 24 h in the fridge.
4) After 24 h, autoclave for 40 min (at 121° C.) [liquid cycle].
5) Inoculate by a small agar block with growing hyphae of *pythium*, from a PDAC plate.
6) Put a sterile birthing cloth on top of the bottle and close the blue lid loosely.
7) Put the solid phase growth bottle in the incubator, at 27° C. for 3 days.
8) Use a 3-days old culture to prepare the *inoculum* suspension.

Example 14. Validation Experiments in Tomato Detached Leaves Infected with *Phytophthora infestans*

General description: Detached leaves of tomato were treated by pinocembrin dihydrochalcone and infected by spores of *Phytophthora infestans*

*Phytophthora* Spore Suspension Preparation

Prepare spores according to Example 4 and dilute by water to 1000 spores/ml

Preparation of Tomato Leaves for Inoculation

1) Put two pieces of sterile paper in a square Petri dish
2) Work in sterile conditions
3) Use $3^{rd}$ to $5^{th}$ leaves from the top
4) Add sterile distilled water to wet the paper
5) Cut lobes from the leaves by a sterile scalpel
6) Put 10-lobes of leaves in a square petri dish, on the wet paper, lower side of the leaf should face the paper
7) Cover the plate with lid Treatment and Inoculation of Spores on Detached Leaves 1) Spray 1 ml of treatment on all the leaves in one square dish (using a spraying syringe) on the upper side of the leaf
2) Let the leaves dry in the chemical hood
3) Spray 1 ml of *Phytophthora* spores' suspension on all the leaves in one square dish (using a spraying tool) on the upper side of the leaf
4) Cover the dish and seal it by stretched nylon
5) Allow the fungal growth on the leaves
6) Record the level of infection after 6 days Formulation preparation: See formulation preparation in Formulation section in Example 11.

Figure 2:
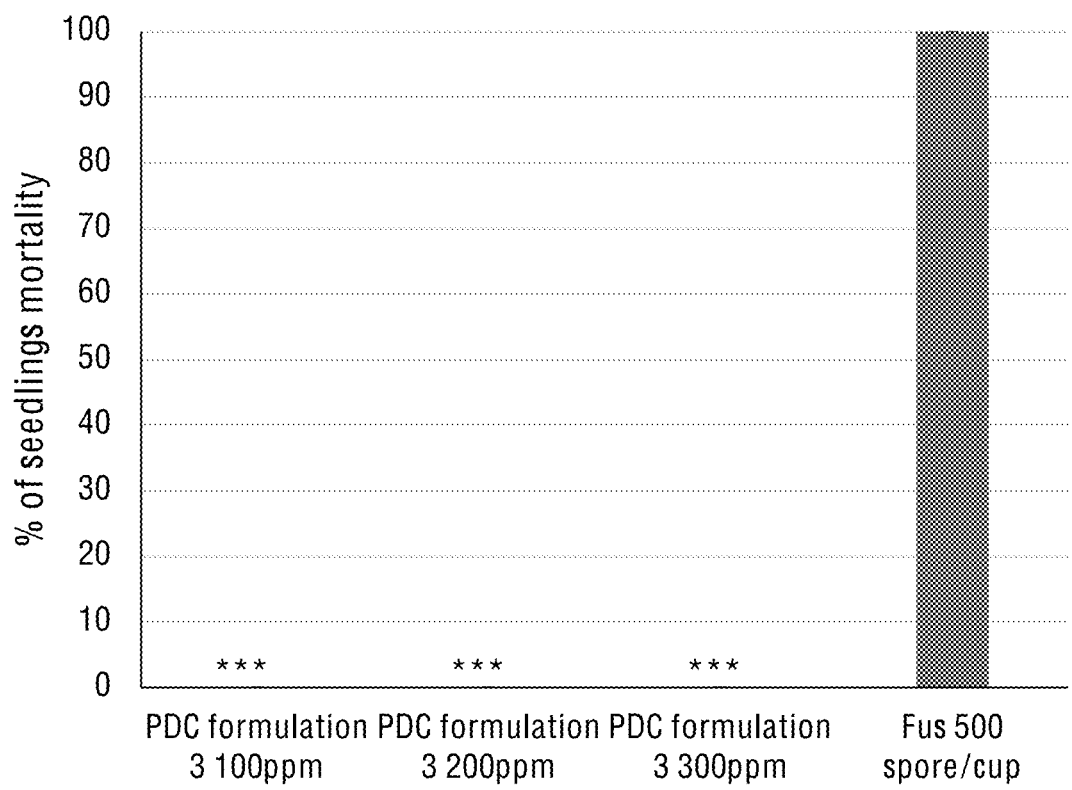
Figure 3:
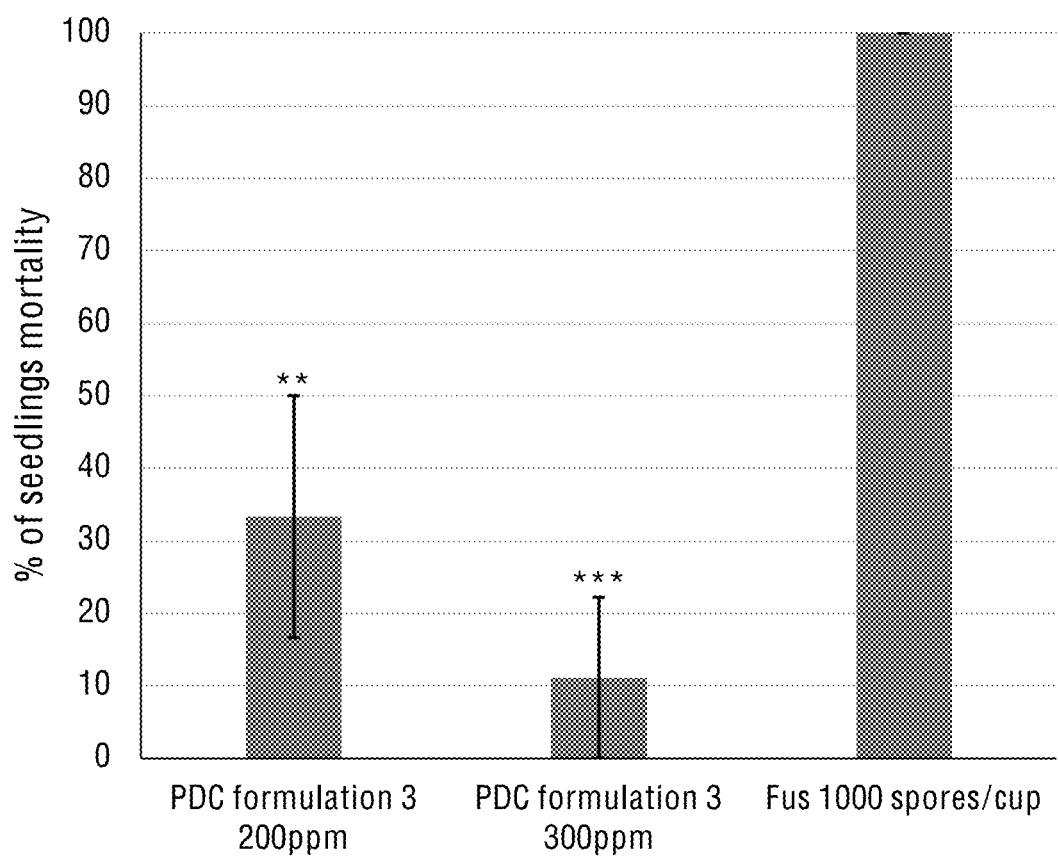
Figure 4:
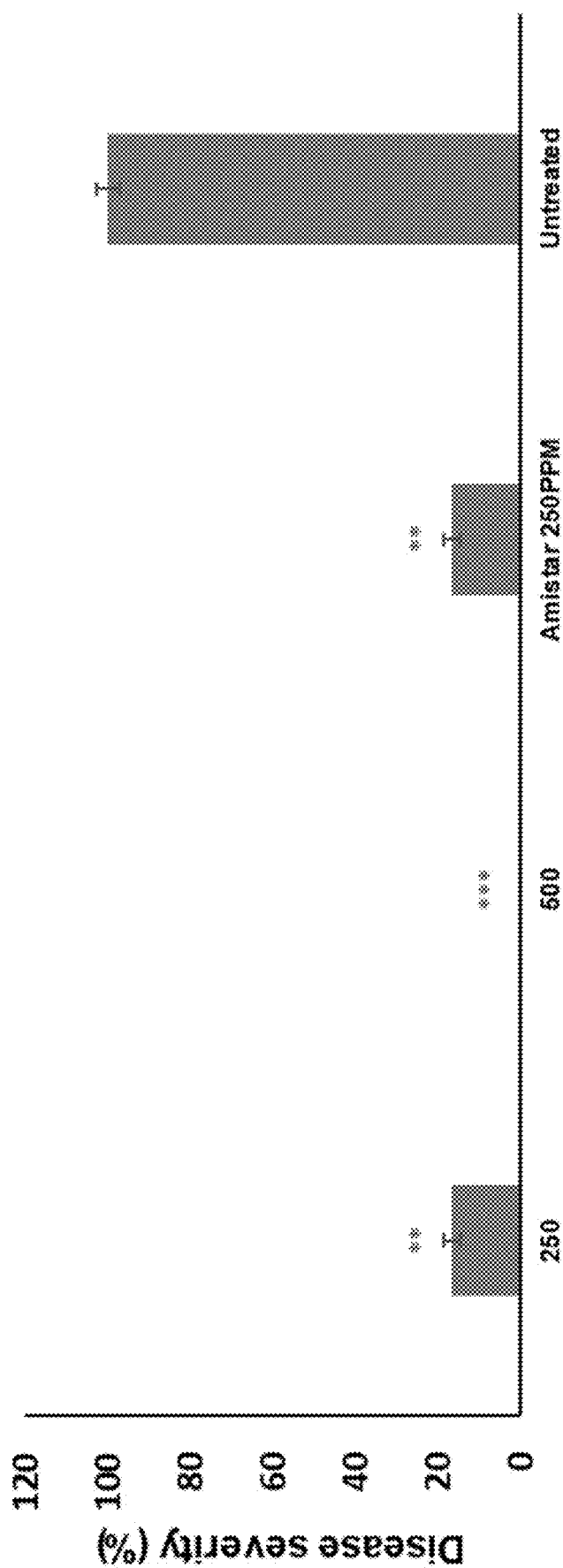
FIGS. 4-5 (experiment 1839 and experiment 1844) show effect of pinocembrin dihydrochalcone (PDC) on cucumber seedlings survival in 2 independent experiments determined as survival percentage 4 days following inoculation with *Pythium aphanidermatum* (preventative approach, application via drenching in soil). * Means that p-value<0.05, means that p-value is <0.01, *means that p-value is <0.001. Amistar® is a suspension concentrate (SC) 250 g/l azoxystrobin reference fungicide from Syngenta. Formulation see Example 11 (B).
Figure 5:
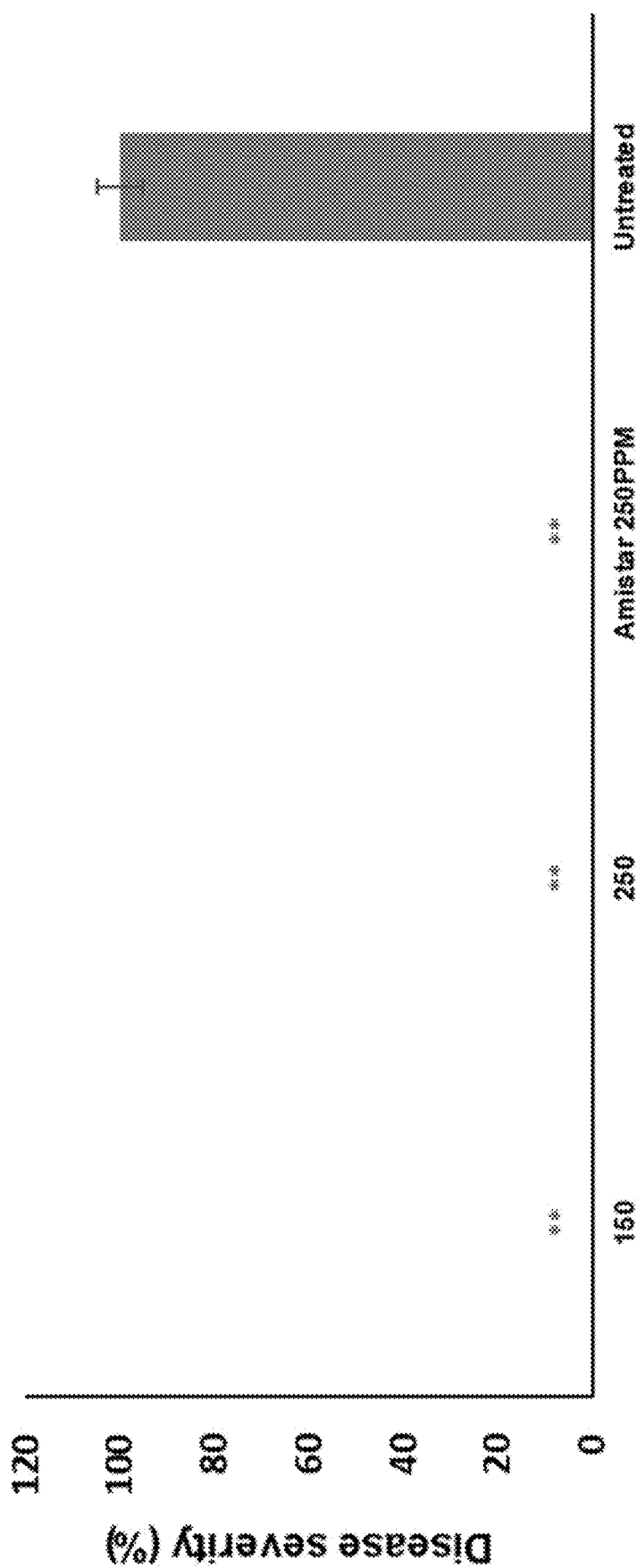
Figure 6:
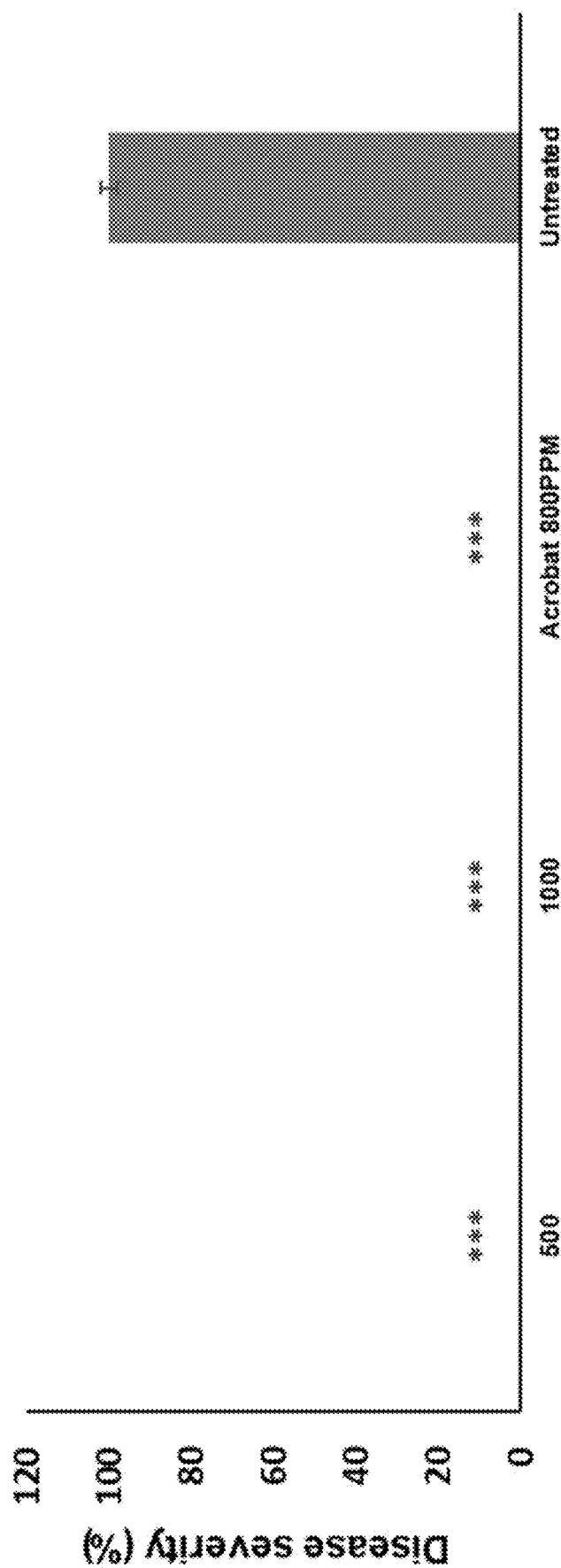
FIG. 6 (experiment 1832) shows effect of pinocembrin dihydrochalcone (PDC) on tomato leaf infection determined as disease severity 6 days after infection with *Phytophthora infestans* (preventative approach, application via spray on leaves, in plates). * Means that p-value<0.05, means that p-value is <0.01, *means that p-value is <0.001. Acrobat® is a reference 500 g/L dimethomorph fungicide (containing 50% dimethomorph) in a wettable powder (WP) formulation from BASF. Formulation—see Example 11 (B).

Results: We conducted 3 independent experiments under controlled environment in growth rooms where we estimated pinocembrin dihydrochalcone's (PDC) potential to prevent and control *Fusarium oxysporum* in cucumber seedlings (FIGS. 1-3). PDC performed very well and showed very good efficacy in all experiments conducted. The range of efficacy of pinocembrin dihydrochalcone in preventing and controlling the *Fusarium* diseases 3 weeks after infection was 66-100% at 100 ppm and 200 ppm and 88-100% at 300 ppm. In addition, we conducted 2 independent experiments under controlled environment in growth rooms where we estimated pinocembrin dihydrochalcone's (PDC) potential to prevent and control *Pythium* in cucumber seedlings (FIGS. 4-5). PDC performed very well and showed very good efficacy in all experiments conducted. The range of efficacy of pinocembrin dihydrochalcone in preventing and controlling the *Pythium* disease 4 days after infection was up to 100% at 150 ppm-500 ppm. Pinocembrin dihydrochalcone controlled *Phytophthora infestans* in detached leaf discs experiment up to 100% at 500-1000 ppm.

Examples 15-18. Additional In-Planta Experiments

These experiments are conducted for pesticidal activity evaluation of pinocembrin dihydrochalcone against *Rhizoctonia solani, Pseudomonas syringae, Pectobacterium carotovorum, Pythium aphanidermatum* and *Fusarium oxysporum*.

Example 15. In-Planta Validation of Pinocembrin Dihydrochalcone Treatment of Cucumber Seedlings Infected with *Rhizoctonia solani*

Procedure:
Inoculation System Preparation:
1) Use an autoclavable plastic sheet. Cut the plastic sheet to the exact size of the inside of the beaker. Cut 6 holes in the plastic sheet.
2) Use three 1000 ul tips to hold the plastic sheet at the height of 5 mm above the surface of 50 ml in the beaker.
3) Add 50 ml distilled water.
4) Add 0.5% of standard fertilizer (250 ul).
5) Cover the beaker with cloth and rubber ring.
6) Autoclave for 30 min (at 121° C.).
7) Let the infection system cool in the hood, open the cloth lid and put 3 2 days old, germinating cucumber seedlings in 3 holes of the support plastic sheet.
8) Cover the beaker with the cloth lid.
9) Put the infection system in the growth room at 27° C. for one day.
10) When the seedlings are 4 days old, inoculate with *Rhizoctonia solani*.
11) Inoculation: inoculate 2 ml, mix the medium well to until the hyphae is attached to the roots.
12) Shake the cups at 100 RPM all the time.
13) For inoculation—use *Rhizoctonia* grown for 10 days on liquid medium diluted in water to final concentration 1% by weight. Add pinocembrin dihydrochalcone to the medium up to desired concentration.
14) For control group—use 2 ml of water.
15) Put the inoculation system in the growth room, on a shaker (100 RPM), with 12 h light, at 27° C. for 7 days.
16) After 7 days record the number of dead seedlings and calculate the survival rate and compare to the control group.

Cucumber Sprouts Preparation:
1) Use square transparent covered plastic plates [12×12 cm].
2) Prepare water agar 1%, insert 4 g agar into a 500 ml bottle and add 400 ml distilled water.
3) Autoclave for 30 min (at 121° C.).
4) Add 50 ml water agar 1% to the square plate and cover it.
5) Let the agar cool.
6) Mark the one side of the plate to be the bottom.
7) Insert 20 cucumber seeds into each plate; put the seeds in 3 rows, press them into the solid with their sharp side pointing to the bottom mark.
8) Put the plates in an incubator at 27° C. for 2 days.
9) Use the well-developed sprouts for the experiment when the seedlings are 2 days old. About 90% of the sprouts should have long and branched root at this stage.
10) Cut the sprouts from the agar by pulling them out. No agar should remain on the roots.

*Rhizoctonia solani* Inoculum Preparation:
1) Grow *Rhizoctonia* for 10 days on a liquid medium.
2) Collect the hyphae insert it into water and reduce the hyphae size using the blender.
3) Diluted in water to final concentration of 1% by weight.
4) Use immediately to infect the plants.

Example 16. In-Planta Validation of Pinocembrin Dihydrochalcone Treatment of Tomato Seedlings Infected with *Pseudomonas syringae*

Procedure:
*Pseudomonas* Suspension Preparation:
1) Prepare a 50 ml sterile tube with 5 ml of LB.
2) Insert 50 ul of *Pseudomonas* stock from the freezer.
3) Close the tube tightly with the lid.
4) Put the tube in a shaker at 150 RPM and grow 16 h at 27° C.
5) Use immediately to infect potato slices.
6) Prepare a suspension of 1:10 diluted culture in water.

Preparation of Tomato Seedlings for Inoculation:
1) Use 30 days old tomato seedlings.
2) Plant the seedling in a small pot.
3) After a week infect the tomato seedlings leaves.

Application of the Pinocembrin Dihydrochalcone:
Apply the tested chemical dissolved in the water at desired concentrations before inoculation and wait for it to dry in the chemical hood about 3 h. Use water as a control treatment.

Inoculation of Bacteria on Tomato Seedlings Leaves:
1) Apply as a spray 1 ml of *Pseudomonas* suspension on each tomato seedling (using a syringe spray tool).
2) Allow the bacteria to infect tomato seedlings in the incubator at 25° C.
3) The tomato seedling leaves should be infected after about ~5 days after inoculation.
4) Spray the control group with water.
5) Count the number of spots to evaluate the compound treatment effect and compare to the control group.

Example 17. In-Planta Validation in Potato Seedlings Infected with *Pectobacterium carotovorum*

Procedure:
*Pectobacterium* Suspension Preparation:
1) Prepare a 50 ml sterile tube with 5 ml of LB.
2) Insert 50 ul of *Pectobacterium* stock from the freezer.
3) Close the tube tightly with the lid.
4) Put the tube in a shaker at 150 RPM and grow 16 h at 27° C.
5) Use immediately to infect potato slices.
6) Prepare a suspension of 1:10 diluted culture in water.

Preparation of Potato Tubers for Inoculation:
1) Put two pieces of sterile paper in a clean tip box.
2) Work in sterile conditions.
3) Add sterile distilled water to wet the paper—20 ml (the paper should be maximally wet, but without additional dripping water).
4) Use small potato tubers from the supermarket kept in plastic bags at 4-8° C.
5) Make very small cuts on the surface of the potato using a sterile scalpel.
6) Put 4 small potatoes in the box on the wet paper.
7) Cover the plate with its lid.

Application of Pinocembrin Dihydrochalcone:
Apply the tested chemical dissolved in the water at desired concentrations before inoculation and wait for it to dry in the chemical hood about 3 h. Use water as a control treatment.

Inoculation of Bacteria on Potatoes:
1) Spray 1 ml of *Pectobacterium* suspension on 4 potatoes in one box (using a syringe spray tool).
2) Cover the dish.

3) Allow the bacteria to infect the potato in the incubator at 25° C.
4) The potatoes should be infected after about 5 days. They should become soft and dark.

Example 18. In-Planta Validation of Pinocembrin Dihydrochalcone Treatment of Cucumber Seedlings Infected with *Fusarium* Infection Under GH (Greenhouse) Conditions General description: *Fusarium* is propagated separately, then at the correct age, cucumber seedlings in soil, placed in a tray are infected with the pathogen hyphae. The disease severity observation is performed at about 7, 14, and 21 days after inoculation. The plants are treated with pinocembrin dihydrochalcone about 24 h prior to inoculation with *Fusarium*.

Analysis of disease severity is performed about 21 days post inoculation.

*Fusarium* Inoculum Preparation:
1) Insert 10 ml Quinoa seeds into a 100 ml bottle. Use a 50 ml tube to measure the volume
2) Add 10 ml sterile distilled water.
3) Let the seeds absorb the water for 24 h, in the fridge.
4) After 24 h put a birthing cloth on top of the bottle, and close loosely the blue lid on top.
5) Autoclave for 40 min (at 121° C.) [liquid cycle]
6) Let cool in the hood and remove the lid.
7) Inoculate a small block of *Fusarium* grown on PDAC plate.
8) Put back the birthing cloth and lid.
9) Write the fungus name and the date.
10) Put the solid phase growth bottle in the incubator, at 27° C.
11) After 8-10 days the *Fusarium* should be ready to inoculate plants.
12) Homogenize the *fusarium* hyphae:
    A. Use a 250 ml beaker and a stick blender to prepare the blend.
    B. Add 100 ml water
    C. Add 1 g of *Fusarium* solid phase culture, to get 1% hyphae suspension.
    D. Homogenize at high speed for 2 min on ice.
    E. Dilute the homogenized hyphae suspension with sterile water to get 0.5% hyphae suspension.
    F. Use the diluted homogenized hyphae suspension (0.5%) immediately to inoculate the seedlings in soil system.

Inoculation of Plants in Soil System:
1) Use seedlings of cucumber in a seedling tray, from the nursery. Seedlings should be 6 days old (after sowing date), before or just at the generation of first real leaves.
2) Put the tray with cucumber seedlings under irrigation system in a greenhouse table (temp 20±27° C., without light supplementation) to allow seedling germination, excess of water should be freely removable from the conus trays.
3) At the 6$^{th}$ day from seeding stage, the treatment should be applied (formulated pinocembrin dihydrochalcone). Inoculum should be performed 24 h post treatment. Treat each plant with 6 ml of formulation, and similarly, upon inoculation, volume to seedling should be 6 ml. The treatment and the *inoculum* are expected to evenly distribute in the rhizosphere.
4) Mark the tray with a sign for experimental number, and update experimental page with dates of treatment and inoculation Growth and Analysis:
1) Grow the cucumber for 7, 14 and 21 days, with below tray irrigation, supplemented with fertilizer (40 ppm). At day 7, move all plants into 100 ml trays to allow further plant development.
2) Follow-up disease development at days 7, 14 and 21.
3) Cotyledon of seedlings should become yellowish (disease symptoms), until drying of seedlings/plants
4) Count the sick and dead seedlings should be performed at 7, 14, 21 days after inoculation.
5) Calculate the percentage of dried/dead plants per each treatment.
6) The following treatments will be included in the experiment: formulated pinocembrin dihydrochalcone, industrial reference product, blank (water)

Statistical Analysis for Validation Experiments.

To evaluate the effect of a compound in infected plants compared to control plants (infected but not treated) the data was analyzed by Student's t-test and the p value is calculated. The minimum number of repeats in each experiment was 3. Results were considered significant if $p<0.05$.

REFERENCES

Erlacher A., Cardinale M., Grosch R., Grube M., Berg G. The impact of the pathogen *Rhizoctonia solani* and its beneficial counterpart *Bacillus amyloliquefaciens* on the indigenous lettuce microbiome. Front Microbiol. 2014; 5: 175.

Mesfin Kebede Gessese. Description of Wheat Rusts and Their Virulence Variations Determined through Annual Pathotype Surveys and Controlled Multi-Pathotype Tests. Advances in Agriculture, 2019; Article ID 2673706.

Groth, J. V., Zeyen, R. J., Davis, D. W., & Christ, B. J. (1983). Yield and quality losses caused by common rust (*Puccinia sorghi* Schw.) in sweet corn (*Zea mays*) hybrids. Crop Protection, 2(1), 105-111.

Hofte M. and De Vos P. Plant pathogenic *pseudomonas* species. Gnanamanickam S.S. (ed.), Plant-Associated Bacteria, 2006; 507-533.

Jenkins J. E. E., Clark Y. S. and Buckle A. E. *Fusarium* diseases of cereals. Research Review 4. October 1988.

Frank N. Martin & Joyce E. Loper. Soilborne Plant Diseases Caused by *Pythium* spp.: Ecology, Epidemiology, and Prospects for Biological Control. Critical Reviews in Plant Sciences, 1999; 18:111-181.

Dong Hwan Lee, Jeong-A Lim, Juneok Lee, Eunjung Roh, Kyusuk Jung, Minseon Choi, Changsik Oh, Sangryeol Ryu, Jongchul Yun, Sunggi Heu. Characterization of genes required for the pathogenicity of *Pectobacterium carotovorum* subsp. *carotovorum* Pcc21 in Chinese cabbage. Microbiology. 2013 July; 159(Pt 7): 1487-1496.

Moore. L. W. *Pseudomonas syringae*: disease and ice nucleation activity. Ornamentals Northwest Newsletter. (1988) 12:4-16.

Savory E A, Granke L L, Quesada-Ocampo L M, Varbanova M, Hausbeck M K, Day B. The cucurbit downy mildew pathogen *Pseudoperonospora cubensis*. Mol Plant Pathol. 2011 April; 12(3):217-26.

Sedláková V., Dejmalová J., Hausvater E., Sedlák P., Dolǎal P. and Mazáková J. "Effect of *Phytophthora infestans* on potato yield in dependence on variety characteristics and fungicide control". Plant Soil Environment, 57, 2011 (10): 486-491.

Timilsina, S., Potnis, N., Newberry, E. A. et al. *Xanthomonas* diversity, virulence and plant-pathogen interactions. Nat Rev Microbiol 18, 415-427 (2020).

The invention claimed is:

1. A method for controlling, preventing, reducing or eradicating the instances of plant-pathogen infestation on a plant, plant organ, plant part, or plant propagation material, the method comprising: applying to a plant, plant part, plant organ or plant propagation material, or to soil surrounding said plant, a pesticidal effective amount of pinocembrin dihydrochalcone or a pesticide composition thereof comprising a pesticidally effective amount of pinocembrin dihydrochalcone, wherein said plant-pathogen is a member selected from:
a) *Fusarium oxysporum, Fusarium avenaceum, Fusarium bubigeum, Fusarium circinatum, Fusarium crookwellense, Fusarium culmorum, Fusarium graminearum, Fusarium langsethiae, Fusarium poae, Fusarium proliferatum, Fusarium solani, Fusarium sporotrichioides, Fusarium tricinctum, Fusarium venenatum, Fusarium verticillioides, Fusarium virguliforme;*
b) *Sclerotinia sclerotiorum, Sclerotinia borealis, Sclerotinia* bulborum (Wakker) Sacc., *Sclerotinia* homoeocarpa F.T. Benn., *Sclerotinia* minor Jagger, *Sclerotinia* ricini, *Sclerotinia sclerotiorum* (Lib.) de Bary, *Sclerotinia* spermophila Noble, *Sclerotinia* sulcate, *Sclerotinia* trifoliorum Erikss., *Sclerotinia* veratrin;
c) *Pythium aphanidermatum;*
d) *Pseudomonas syringae;*
e) *Pectobacterium carotovorum, Pectobacterium* aroidearum;
f) *Rhizoctonia solani, Rhizoctonia bataticola, Rhizoctonia carotae, Rhizoctonia cerealis, Rhizoctonia crocorum, Rhizoctonia fragariae, Rhizoctonia* goodyerae-*repentis, Rhizoctonia oryzae,* and *Rhizoctonia* ramicola.

2. The method of claim 1, wherein said *Fusarium* plant-pathogen is *Fusarium oxysporum.*

3. The method of claim 1, wherein said *Sclerotinia* plant-pathogen is *Sclerotinia sclerotiorum.*

4. The method of claim 1, wherein said plant-pathogen is *Pythium aphanidermatum.*

5. The method of claim 1, wherein said *Rhizoctonia* plant-pathogen is *Rhizoctonia solani.*

6. The method of claim 1, wherein said plant-pathogen is *Pectobacterium* caratovorum or *Pectobacterium* aroidearum.

7. The method of claim 1, wherein said plant-pathogen is *Pseudomonas syringae.*

8. The method of claim 1, wherein pinocembrin dihydrochalcone or a composition thereof is applied to said plant, plant part, plant organ or plant propagation material, or to soil surrounding said plant by spraying, immersing, dressing, coating, pelleting or soaking.

9. The method of claim 1, wherein said composition comprises pinocembrin dihydrochalcone at a concentration of between 10 ppm to 2000 ppm.

10. The method of claim 1, wherein said composition comprises pinocembrin dihydrochalcone at a concentration of between 100 ppm to 500 ppm.

11. The method of claim 1, wherein said composition comprises pinocembrin dihydrochalcone at a concentration of between 200 ppm to 500 ppm.

12. The method of claim 1, wherein said composition comprises pinocembrin dihydrochalcone at a concentration of between 300 ppm to 500 ppm.

* * * * *